United States Patent
Lindqvist et al.

(10) Patent No.: US 12,250,651 B2
(45) Date of Patent: Mar. 11, 2025

(54) COMMUNICATING TIMING ACCURACY INFORMATION FOR SYNCHRONIZATION SOURCE OF NETWORK NODE AND RELATED APPARATUSES

(71) Applicant: Telefonaktiebolaget LM Ericsson (publ), Stockholm (SE)

(72) Inventors: Sebastian Lindqvist, Norrköping (SE); Angelo Centonza, Torrenueva Costa Granada (ES); Alberto Gonzalez Escudero, Linköping (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 330 days.

(21) Appl. No.: 17/796,204

(22) PCT Filed: Jan. 31, 2020

(86) PCT No.: PCT/IB2020/050808
§ 371 (c)(1),
(2) Date: Jul. 28, 2022

(87) PCT Pub. No.: WO2021/152353
PCT Pub. Date: Aug. 5, 2021

(65) Prior Publication Data
US 2023/0072917 A1 Mar. 9, 2023

(51) Int. Cl.
*H04W 56/00* (2009.01)
(52) U.S. Cl.
CPC .................. *H04W 56/0015* (2013.01)

(58) Field of Classification Search
None
See application file for complete search history.

(56) References Cited

U.S. PATENT DOCUMENTS

| | | | |
|---|---|---|---|
| 2003/0117997 A1 | 6/2003 | Kim Young | |
| 2004/0008646 A1* | 1/2004 | Park | H04B 7/2643 370/335 |
| 2009/0168750 A1 | 7/2009 | Pelletier et al. | |
| 2017/0359790 A1* | 12/2017 | Wang | H04J 11/005 |

(Continued)

FOREIGN PATENT DOCUMENTS

| | | |
|---|---|---|
| EP | 3291616 A1 | 3/2018 |
| WO | WO 2020/240253 A1 | 12/2020 |

OTHER PUBLICATIONS

International Search Report and Written Opinion of the International Searching Authority, PCT/IB2020/050808, mailed Jan. 21, 2021, 18 pages.

(Continued)

*Primary Examiner* — Eunsook Choi
(74) *Attorney, Agent, or Firm* — Sage Patent Group

(57) ABSTRACT

A method performed by a first network node in a radio access network is provided. The method includes determining to initiate a procedure with a first set of at least one neighboring network node. The method further includes, responsive to the determining, sending to the first set of at least one neighboring network node a first message including timing accuracy information for at least one synchronization source of the first network node on at least one of a per cell basis, a per network node basis, or a per neighboring network node for a cell served by the first network node.

18 Claims, 9 Drawing Sheets

(56) References Cited

U.S. PATENT DOCUMENTS

2022/0217664 A1* 7/2022 Toeda ............... H04W 56/002
2022/0400458 A1* 12/2022 Keskitalo ............ H04W 56/001

OTHER PUBLICATIONS

3rd Generation Partnership Project; Technical Specification Group Radio Access Network; NR; Radio Resource Control (RRC) protocol specification (Release 15) 3GPP TS 38.331 V15.6.0 (Jun. 2019) 519 pages.

3rd Generation Partnership Project; Technical Specification Group Radio Access Network; NR; Requirements for support of radio resource management (Release 15) 3GPP TS 38.133 V15.6.0 (Jun. 2019) 999 pages.

3rd Generation Partnership Project; Technical Specification Group Radio Access Network; Evolved Universal Terrestrial Radio Access (E-UTRA) and NR; Multi-connectivity; Stage 2 (Release 15) 3GPP TS 37.340 V15.6.0 (Jun. 2019) 69 pages.

3rd Generation Partnership Project; Technical Specification Group Radio Access Network; NG-RAN; Architecture description (Release 15) 3GPP TS 38.401 V15.6.0 (Jul. 2019) Technical 46 pages.

ZTE, et al., "(TP for Introduction of NR_IIOT support to TS38.473) Providing accurate reference time Information from gNB-DU to gNB-CU," 3GPP TSG-RAN WG3 #106, R3-196660 (Revision of R3-195054), Reno, NV, USA, Nov. 18-22, 2019, XP051820473, 5 pages.

NTT Docomo, Inc., et al., "Time reference information delivery,", 3GPP TSG-RAN WG3 #104, R3-192509, Reno, NV, USA, May 13-17, 2019, XP051712719, 8 pages.

Huawei, "TSN synchronization requirements and scenarios," 3GPP TSG-RAN3 Meeting #103, R3-190862, Athens, Greece, Feb. 25-Mar. 1, 2018, XP051604796, 3 pages.

International Search Report, PCT/IB2019/054435, mailed Feb. 13, 2020, 3 pages.

* cited by examiner

| Sub-carrier spacing in E-UTRA PCell (kHz) | UL Sub-carrier spacing for data in PSCell (kHz) | Maximum uplink transmission timing difference (μs) |
|---|---|---|
| 15 | 15 | 35.21 |
| 15 | 30 | 35.21 |
| 15 | 60 | 35.21 |
| 15 | 120 | 35.21 |

Figure 2

| Frequency Range | Maximum transmission timing difference (μs) |
|---|---|
| FR1 | 34.6 |
| FR2 | 8.5 |
| Between FR1 and FR2 | 25.1 |

Figure 3

| Sub-carrier spacing in E-UTRA PCell (kHz) | UL Sub-carrier spacing for data in PSCell (kHz) | Maximum uplink transmission timing difference (μs) |
|---|---|---|
| 15 | 15 | 500 |
| 15 | 30 | 250 |
| 15 | 60 | 125 |
| 15 | 120[Note 1] | 62.5 |
| NOTE 1: | For E-UTRA FDD-NR FDD and E-UTRA TDD-NR TDD intra-band EN-DC, for which the requirement is defined in clause 7.5.3 and this Table 7.5.2-1 is also applicable, the scenario with 120kHz PSCell does not exist. | |

Figure 4

COMMUNICATING TIMING ACCURACY INFORMATION FOR SYNCHRONIZATION SOURCE OF NETWORK NODE AND RELATED APPARATUSES

CROSS REFERENCE TO RELATED APPLICATIONS

This application is a 35 U.S.C. § 371 national stage application of PCT International Application No. PCT/IB2020/050808 filed on Jan. 31, 2020, the disclosure and content of which is incorporated by reference herein in its entirety.

TECHNICAL FIELD

The present disclosure relates generally to radio access networks and, more particularly, to communicating timing accuracy information for a synchronization source of a network node.

BACKGROUND

In New Radio (NR), time synchronization is required. In time division duplex (TDD) frequencies the cells must coordinate the transmission and reception to minimize interference, but also in frequency division duplex (FDD), the cells must coordinate the transmission of the synchronization signal (SSB) so all cells transmit them within a 1-5 ms time window. This window is signaled to a user equipment (UE) via radio resource control (RRC) parameter SMTC (SSB measurement timing configuration). The smaller the window the more precise the information to the UE can be about where to search for SSBs. It is possible to tell a UE the exact SSB index to search for with an RRC parameter referred to as ssb-ToMeasure and whether all the cells in a given frequency are tightly synchronized via deriveSSB-IndexFromCell.

SUMMARY

In various embodiments of the present disclosure, a method performed by a first network node in a radio access network is provided. The method includes determining to initiate a procedure with a first set of at least one neighboring network node. The method further includes, responsive to the determining, sending to the first set of at least one neighboring network node a first message including timing accuracy information for at least one synchronization source of the first network node on at least one of a per cell basis, a per network node basis, or a per neighboring network node for a cell served by the first network node.

In some embodiments, further operations performed by the first network node include receiving a second message from a second set of at least one neighboring network node providing timing accuracy information for at least one synchronization source of the second set of at least one neighboring network node. The providing includes providing the timing accuracy information for the at least one synchronization source of the second set of at least one neighboring network node on at least one of a per cell basis, a per network node basis, or a per neighboring network node for the cell served by the second set of at least one neighboring network node.

In some embodiments, further operations performed by the first network node include sending a third message to the first set of at least one neighboring network node providing an update to the timing accuracy information. The update to the timing accuracy information includes at least one of the following for a time subsequent to when the first message was sent: an identity of the at least one synchronization source; a priority level of the at least one synchronization source relative to other synchronization sources; a status of synchronization of the at least one synchronization source; an accuracy of the at least one synchronization source; a stability of the at least one synchronization source; a timescale of the at least one synchronization source; an origin or an epoch of the timescale of the at least one synchronization source; and an indication of whether the first network node is synchronized directly or indirectly to an absolute time reference source.

In some embodiments, further operations performed by the first network node include receiving a fourth message from the second set of at least one neighboring network node providing an update to the timing accuracy information. The update to the timing accuracy information comprises at least one of the following for a time subsequent to when the second message was received: an identity of the at least one synchronization source; a priority level of the at least one synchronization source relative to other synchronization sources; a status of synchronization of the at least one synchronization source; an accuracy of the at least one synchronization source; a stability of the at least one synchronization source; a timescale of the at least one synchronization source; an origin or an epoch of the timescale of the at least one synchronization source; and an indication of whether the first network node is synchronized directly or indirectly to an absolute time reference source.

In some embodiments, further operations performed by the first network node include determining an accuracy of the first network node based on the timing accuracy information.

In some embodiments, further operations performed by the first network node include determining when to schedule a measurement gap for a mobile terminal to measure at least one cell for which the timing accuracy information was provided.

In some embodiments, further operations performed by the first network node include deciding whether dual connectivity with at least one of the first set of at least one neighboring network node and the second set of at least one neighboring network node can be performed based on the received timing accuracy information.

In some embodiments, further operations performed by the first network node include, based on the received timing accuracy information, indicating to a mobile terminal one or more of: for the mobile terminal to measure on a target cell using source cell timing; the identity of a synchronization signal (SS) physical broadcast channel (PBCH) block measurement time configuration (SMTC) window length; and whether a parameter for measuring a set of synchronization signal blocks (SSB) within the SMTC window length can be used.

Corresponding embodiments of inventive concepts for a first network node, computer products, and computer programs are also provided.

In some approaches, for example where nodes can share the SFN offset in regard with their own network synchronization information (if available) over the F1AP, X2AP and XnAP interfaces as part of setup and configuration update procedures), a potential problem may be that by not informing of the precision of the synchronization source, this factor cannot be considered to take other decisions, like setup of synchronous/asynchronous Dual Connectivity or Carrier Aggregation. Additionally, in some approaches where nodes are synchronized, but the sum of synchronization errors of two nodes is over a certain amount, an incorrect offset might be signaled, causing asynchronous EN-DC to fail or degrade. Additionally, by not informing of the precision of a synchronization source, this factor cannot be considered in taking take other decisions, like setup of synchronous/asynchronous Dual Connectivity or Carrier Aggregation.

Various embodiments of the present disclosure may provide solutions to these and other potential problems. In various embodiments of the present disclosure, information about synchronization sources (e.g. time source, time scale) and clock qualities (e.g. accuracy, offset, variance, etc.) may be added per node or cell over at least one of the F1AP, XnAP, X2AP, or other interfaces. As a consequence, by including time accuracy information, it may be possible to optimize the logic of what connectivity scenarios are supported between cells in different nodes. For example, whether dual connectivity is possible; deciding if the use of short gaps is appropriate; indicating to a user equipment to measure on a target cell using source cell timing; and/or deciding which SMTC window to use and if a ssb-ToMeasure parameter and/or a deriveSSB-IndexFromCell can be used.

BRIEF DESCRIPTION OF DRAWINGS

The accompanying drawings, which are included to provide a further understanding of the disclosure and are incorporated in and constitute a part of this application, illustrate certain non-limiting embodiments of inventive concepts. In the drawings:

FIG. 2 illustrates requirements for inter-band EN-DC from 3GPP TS 38.133 v15.6.0 (2019-06) Requirements for support of radio resource management;

FIG. 3 illustrates requirements for NR carrier aggregation from 3GPP TS 38.133 v15.6.0 (2019-06) Requirements for support of radio resource management;

FIG. 4 is table 7.5.2-1 from section 7.5.2, Minimum Requirements for inter-band EN-DC, from 3GPP TS 38.133 v15.6.0 (2019-06) illustrating maximum uplink transmission timing differences requirement for asynchronous EN-DC;

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter. The term "terminal" is used in a non-limiting manner and, as explained below, can refer to any type of radio communication terminal. The term "terminal" herein may be interchangeable replaced with the term "radio terminal," "radio communication terminal," "radio device," or "user equipment (UE)."

A 3GPP solution to find the time difference between cells is to use system frame number (SFN) and frame timing differences (SFTD) measurements, where UEs are configured to measure on the target cell SFN and frame boundary difference and report it back to the serving cell as a relative offset, providing the serving node with time offset information.

In one approach, nodes can share the SFN offset in regard with their own network synchronization (sometimes referred to herein as "sync") information, if available, over the F1AP, X2AP and XnAP interfaces as part of the setup and configuration update procedures.

In order to avoid dependencies on UE implementations and capabilities and to avoid the need for alignment of the SFN0 start between a serving cell and a neighbor cell that could be measured by a UE, the only solution is to implement NR FDD and broadcast SSB every 5 ms. That is because a longest measurement gap may have a duration of 6 ms, hence allowing the UE to always detect the SSB with up to 5 ms periodicity like it was in LTE.

Additionally, even for asynchronous dual connectivity between Long Term Evolution (LTE) and NR, each node must be aware of the other cell timing. This is needed to coordinate measurements, gaps, or discontinuous reception, among others.

Figure 1:
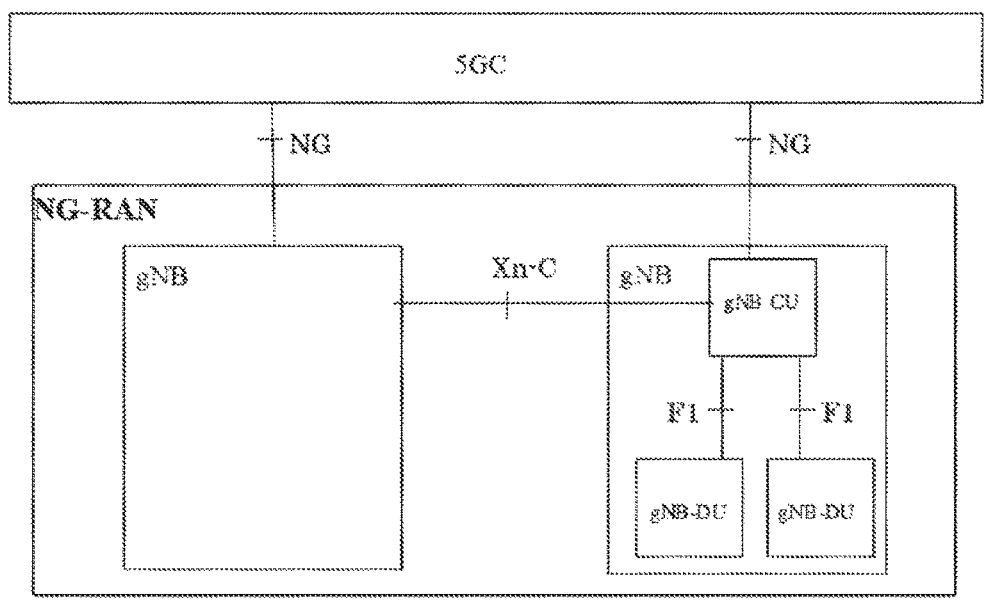
FIG. 1 illustrates a split architecture as shown in FIGS. 6.1-1, Overall architecture from 3GPP TS 38.401 v15.6.0 (2019-07), section 6.1.1 Overall Architecture of 56-RAN in NR.

In NR, it is possible to deploy next generation node Bs (gNBs) in what is called split architecture. See e.g., 3GPP TS 38.401 v15.6.0 (2019-07), Architecture description. FIG. 1 illustrates a split architecture as shown FIG. 6.1-1, Overall architecture from 3GPP TS 38.401 v15.6.0 (2019-07), section 6.1.1 Overall Architecture of 5G-RAN.

For LTE, similar deployments may be considered.

Dual connectivity is an aggregation of cells between two nodes, where the cells can be the same or different radio access technologies. See e.g., chapter 4 from 3GPP TS 37.340 v15.6.0 (2019-06) NR, Multi-connectivity, Overall description.

The following explanation of potential problems is a present realization as part of the present disclosure and is not to be construed as previously known by others. In some approaches referenced above (where nodes can share the SFN offset in regard with their own network sync information, if available, over the F1AP, X2AP and XnAP interfaces as part of the setup and configuration update procedures), a potential problem may be that by not informing of the precision of the synchronization source, this factor cannot be considered to take other decisions, like setup of synchronous/asynchronous Dual Connectivity or Carrier Aggregation.

FIGS. 2 and 3 illustrate requirements for inter-band EN-DC and NR carrier aggregation, respectively, from 3GPP TS 38.133 v15.6.0 (2019-06) Requirements for support of radio resource management. Referring to FIG. 2, in 3GPP TS 38.133 v.15.6.0 section 7.5.2, the UE shall be capable of handling a maximum uplink transmission timing difference between E-UTRA primary cell (PCell) and primary SCell (PSCell) as shown in Table 7.5.2-2, which is reproduced in FIG. 2 herein. Referring to FIG. 3, in 3GPP TS 38.133 v.15.6.0 section 7.5.4, the UE shall be capable of handling at least a relative transmission timing difference between slot timing of different timing advance groups (TAGs) as shown in Table 7.5.4-1 (which is reproduced as FIG. 3 herein), provided that the UE is: configured with the pTAG and the sTAG for inter-band NR carrier aggregation in standalone operation mode (SA) or NR-NR Dual Connectivity (NR-DC mode); or configured with more than one sTAG for inter-band NR carrier aggregation in E-Utra New Radio—Dual Connectivity (EN-DC) or NR-E-UTRA Dual Connectivity (NE-DC mode).

In the case of asynchronous EN-DC, there is a requirement by 3GPP for maximum uplink transmission timing difference requirement for asynchronous EN-DC, as shown in FIG. 4. FIG. 4 shows table 7.5.2-1 from section 7.5.2, Minimum Requirements for inter-band EN-DC, from 3GPP TS 38.133 v15.6.0 (2019-06). In 3GPP TS 38.133 v15.6.0 (2019-06), the UE shall be capable of handling a maximum uplink transmission timing difference between E-UTRA PCell and PSCell as shown in FIG. 4.

The requirement translates in that any time difference is allowed. For example, for 15 kHz LTE and 15 kHz NR PSCell, the LTE Subframe is 1 ms, and the NR cell slot is 1 ms. A difference larger than 500 us would result in a difference smaller than 500 us to the next subframe, due to their cyclic nature.

But even in this scenario, to coordinate the resources between eNB and gNB, it is necessary to indicate measurement gap offset and DRX offset referring to the cell SFN.

An example is the CG-Config and CG-ConfigInfo RRC IEs used for internode messages in dual connectivity. In these messages, the offsets are provided from each of the serving cells. In the case where the nodes are synchronized, but the sum of sync errors of the two nodes is over 500 μs, the incorrect offset might be signaled, causing asynchronous EN-DC to fail or degrade.

Four exemplary messages or information elements (IEs) are now described in which offsets would be incorrectly signaled. In each of the four examples, the offset that would be incorrectly signaled is shown below with underlining.

A first exemplary message is the CG-Config message. This message is used to transfer the SCG radio configuration as generated by the SgNB or SeNB.

Direction: Secondary gNB or eNB to master gNB or eNB.

```
                              CG-Config message
-- ASN1START
-- TAG-CG-CONFIG-START
CG-Config :=                   SEQUENCE {
    critical Extensions            CHOICE {
      c1                           CHOICE
        cg-Config                      CG-Config-IEs,
        spare3 NULL, spare2 NULL, spare1 NULL
      },                           SEQUENCE 0
      criticalExtensionsFuture
    }
}
CG-Config-IEs :=               SEQUENCE {
                                  OCTET STRING (CONTAINING RRCReconfigura-
                               tion) OPTIONAL,
                                  OCTET STRING (CONTAINING RadioBearerConfig)  OPTIONAL,
                                      ConfigRestrictModReqSCG               OPTIONAL,
                                  DRX-Info                  OPTIONAL,
                                      OCTET STRING (CONTAINING MeasResultList2NR)
OPTIONAL
    measConfigSN                   MeasConfigSN              OPTIONAL,
    selectedBandCombination            BandCombinationInfoSN              OPTIONAL,
    fr-InfoListSCG                 FR-InfoList            OPTIONAL,
    candidateServingFreqListNR         CandidateServingFreqListNR             OPTIONAL,
    nonCriticalExtension               CG-Config-v1540-IEs         OPTIONAL
}
CG-Config-v1540-IEs :=         SEQUENCE {
    pSCellFrequency                ARFCN-ValueNR            OPTIONAL,
    reportCGI-RequestNR            SEQUENCE {
      requestedCellinfo              SEQUENCE {
        ssbFrequency                   ARFCN-ValueNR,
        cellForWhichToReportCGI            PhysCell Id
      }                                    OPTIONAL
    }                                      OPTIONAL,
    ph-InfoSCG                     PH-TypeListSCG      OPTIONAL,
    nonCriticalExtension               CG-Config-v1560-IEs           OPTIONAL
```

```
}
CG-Config-v1560-IEs :=            SEQUENCE {
   pSCellFrequencyEUTRA              ARFCN-ValueEUTRA              OPTIONAL,
   scg-CellGroupConfigEUTRA          OCTET STRING                  OPTIONAL,
   candidateCellinfoListSN-EUTRA     OCTET STRING                  OPTIONAL,
   candidateServingFreqListEUTRA         CandidateServingFreqListEUTRA        OPTIONAL,
   needForGaps                       ENUMERATED {true}             OPTIONAL,
   drx-ConfigSCG                     DRX-Config                    OPTIONAL,
   reportCGI-RequestEUTRA               SEQUENCE {
      requestedCellinfEUTRA             SEQUENCE {
         eutraFrequency                    ARFCN-ValueEUTRA,
         cellForWhichToReportCGI-EUTRA        EUTRA-PhysCeilid
                                           OPTIONAL
      }                                 OPTIONAL,
   }
   nonCriticalExtension              SEQUENCE {}                   OPTIONAL,
}
PH-TypeListsCG ::=                SEQUENCE (SIZE (1..maxNrofSe ;rvingCeils)) OF PH-InfoSCG
PH-InfoSCG "::=                   SEQUENCE{
   servCellindex                     ServCellindex,
   ph-Uplink                         PH-UplinkCarrierSCG,
   ph-SupplementaryUplink               PH-UplinkCarrierSCG
   ...
}
PH-UplinkCarrierSCG :=            SEQUENCE!
   ph-Type1or3                       ENUMERATED {type1, type3}.
   ...
}
MeasConfigSN ::=                  SEQUENCE{
   measuredFrequenciesSN                SEQUENCE (SIZE (1..maxMeasFreqsSN)) OF NR-Freqinfo
OPTIONAL,
   ...
NR-Freqinfo :=                    SEQUENCE{
   measuredFrequency                    ARFCN-ValueNR
   ...
}
ConfigRestrictModReqSCG ::=          SEQUENCE{
   requested BC-MROC                 BandCombinationInfoSN         OPTIONAL,
   requestedP-MaxFR1                 P-Max                         OPTIONAL,
   ...,
   [[
   requestedPDCCH-BlindDetectionSCG     INTEGER (1..15)            OPTIONAL
   requestedP-MaxEUTRA               P-Max                         OPTIONAL
   ]]
}
BandCombinationIndex := INTEGER (1..maxBandComb)
BandCombinationlnfoSN :=          SEQUENCE{
   bandcombinationindex              BandCombinationIndex,
   requestedFeatureSets              FeatureSetEntryindex
}
FR-InfoList := SEQUENCE (SIZE (1..maxNrofServingCells-1)) OF FR-Info
FR-Info ::= SEQUENCE {
   servCellindex ServCellindex,
   fr-TypeENUMERATED (fr1, fr2)
CandidateServingFreqListNR := SEQUENCE (SIZE (1.. maxFreqIDC-MRDC)) OF ARFCN-ValueNR
CandidateServingFreqLIstEUTRA := SEQUENCE (SIZE (1.. maxFreqiDC-MRDC)) OF ARFCN-
ValueEUTRA
--TAG-CG-CONFIG-STOP
-- ASN1STOP
```

A second exemplary IE is the DRX-Config message. This IE DRX-Config is used to configure DRX related parameters.

| DRX-Config information element |
|---|

```
-- ASN1START
-- TAG-DRX-CONFIG-START
DRX-Config :=          SEQUENCE {
   drx-onDurationTimer       CHOICE {
                    subMilliSeconds INTEGER (1..31),
                    milliseconds   ENUMERATED {
                       ms1, ms2, ms3, ms4, ms5, ms6, ms8, ms10, ms20, ms30, ms40,
ms50, ms60,
                       ms80, ms100, ms200, ms300, ms400, ms500, ms600, ms800,
ms1000, ms1200,
                       ms1600, spare8, spare7, spare6, spare5, spare4, spare3, spare2,
```

-continued

| DRX-Config information element |
|---|

```
spare1 }
                        },
    drx-inactivityTimer         ENUMERATED {
                        ms0, ms1, ms2, ms3, ms4, ms5, ms6, ms8, ms10, ms20, ms30, ms40,
ms50, ms60, ms80,
                        ms100, ms200, ms300, ms500, ms750, ms1280, ms1920, ms2560,
spare9, spare8,
                        spare7, spare6, spare5, spare4, spare3, spare2, spare1},
    drx-HARQ-RTT-TimerDL        INTEGER (0..56),
    drx-HARQ-RTT-TimerUL        INTEGER (0..56),
    drx-RetransmissionTimerDL   ENUMERATED {
                        sl0, sl1, sl2, sl4, sl6, sl8, sl16, sl24, sl33, sl40, sl64, sl80, sl96, sl112,
sl128,
                        sl160, sl320, spare15, spare14, spare13, spare12, spare11, spare10,
spare9,
                        spare8, spare7, spare6, spare5, spare4, spare3, spare2, spare1},
    drx-RetransmissionTimerUL   ENUMERATED {
                        sl0, sl1, sl2, sl4, sl6, sl8, sl16, sl24, sl33, sl40, sl64, sl80, sl96, sl112,
sl128,
                        sl160, sl320, spare15, spare14, spare13, spare12, spare11, spare10,
spare9,
                        spare8, spare7, spare6, spare5, spare4, spare3, spare2, spare1 },
    drx-LongCycleStartOffset    CHOICE {
        ms10                    INTEGER(0..9),
        ms20                    INTEGER(0..19),
        ms32                    INTEGER(0..31),
        ms40                    INTEGER(0..39),
        ms60                    INTEGER(0..59),
        ms64                    INTEGER(0..63),
        ms70                    INTEGER(0..69),
        ms80                    INTEGER(0..79),
        ms128                   INTEGER(0..127),
        ms160                   INTEGER(0..159),
        ms256                   INTEGER(0..255),
        ms320                   INTEGER(0..319),
        ms512                   INTEGER(0..511),
        ms640                   INTEGER(0..639),
        ms1024                  INTEGER(0..1023),
        ms1280                  INTEGER(0..1279),
        ms2048                  INTEGER(0..2047),
        ms2560                  INTEGER(0..2559),
        ms5120                  INTEGER(0..5119),
        ms10240                 INTEGER(0..10239)
    },
    shortDRX                    SEQUENCE {
        drx-ShortCycle          ENUMERATED {
                        ms2, ms3, ms4, ms5, ms6, ms7, ms8, ms10, ms14, ms16, ms20,
ms30, ms32,
                        ms35, ms40, ms64, ms80, ms128, ms160, ms256, ms320, ms512,
ms640, spare9,
                        spare8, spare7, spare6, spare5, spare4, spare3, spare2, spare1},
        drx-ShortCycleTimer     INTEGER (1..16)
    }                                           OPTIONAL, -- Need R
    drx-SlotOffset              INTEGER (0..31)
}
-- TAG-DRX-CONFIG-STOP
-- ASN1STOP
```

A third exemplary message is the CG-ConfigInfo message. This message is used by master eNB or gNB to request the secondary gNB (SgNB) or secondary eNB (SeNB) to perform certain actions, e.g. to establish, modify or release a secondary cell group (SCG). The message may include additional information e.g. to assist the SgNB or SeNB to set the SCG configuration. It can also be used by a central unit (CU) to request a distributed (DU) to perform certain actions, e.g. to establish, modify or release a master cell group (MCG) or SCG. Direction: Master eNB or gNB to secondary gNB or eNB, alternatively CU to DU.

| CG-ConfigInfo message |
|---|

```
-- ASN1START
-- TAG-CG-CONFIG-INFO-START
CG-ConfigInfo :=            SEQUENCE {
    criticalExtensions          CHOICE{
        c1                      CHOICE{
            cg-ConfigInfo           CG-ConfigInfo-IEs,
```

| CG-ConfigInfo message |
|---|
| ```
        spare3 NULL, spare2 NULL, spare1 NULL
      },
      criticalExtensionsFuture    SEQUENCE { }
    }
}
CG-ConfigInfo-IEs ::=    SEQUENCE {
    ue-CapabilityInfo       OCTET STRING (CONTAINING UE-CapabilityRAT-ContainerList)
OPTIONAL,-- Cond SN-AddMod
    candidateCellInfoListMN     MeasResultList2NR                         OPTIONAL,
    candidateCellInfoListSN     OCTET STRING (CONTAINING MeasResultList2NR)
OPTIONAL,
    measResultCellListSFTD-NR   MeasResultCellListSFTD-NR                 OPTIONAL,
    scgFailureInfo          SEQUENCE {
      failureType               ENUMERATED { t310-Expiry, randomAccessProblem,
                                rlc-MaxNumRetx, synchReconfigFailure-SCG,
                                scg-reconfigFailure,
                                srb3-IntegrityFailure},
      measResultSCG             OCTET STRING (CONTAINING MeasResultSCG-Failure)
                                                        OPTIONAL,
    }
    configRestrictInfo      ConfigRestrictInfoSCG          OPTIONAL,
    drx-InfoMCG             DRX-Info                       OPTIONAL,
    measConfigMN            MeasConfigMN                   OPTIONAL,
    sourceConfigSCG         OCTET STRING (CONTAINING RRCReconfiguration)
OPTIONAL,
    scg-RB-Config           OCTET STRING (CONTAINING RadioBearerConfig)
OPTIONAL,
    mcg-RB-Config           OCTET STRING (CONTAINING RadioBearerConfig)
OPTIONAL,
    mrdc-AssistanceInfo     MRDC-AssistanceInfo                          OPTIONAL,
    nonCriticalExtension    CG-ConfigInfo-v1540-IEs                      OPTIONAL
}
CG-ConfigInfo-v1540-IEs ::=   SEQUENCE {
    ph-InfoMCG              PH-TypeListMCG                               OPTIONAL,
    measResultReportCGI     SEQUENCE {
      ssbFrequency              ARFCN-ValueNR,
      cellForWhichToReportCGI   PhysCellId,
      cgi-Info            CGI-InfoNR
    }                                                     OPTIONAL,
    nonCriticalExtension    CG-ConfigInfo-v1560-IEs                      OPTIONAL
}
CG-ConfigInfo-v1560-IEs := SEQUENCE {
    candidateCellInfoListMN-EUTRA    OCTET STRING         OPTIONAL,
    candidateCellInfoListSN-EUTRA    OCTET STRING         OPTIONAL,
    sourceConfigSCG-EUTRA            OCTET STRING         OPTIONAL,
    scgFailureInfoEUTRA              SEQUENCE {
      failureTypeEUTRA               ENUMERATED { t313-Expiry, randomAccessProblem,
                                     rlc-MaxNumRetx, scg-ChangeFailure},
      measResultSCG-EUTRA            OCTET STRING
                                                        OPTIONAL,
    }
    drx-ConfigMCG                DRX-Config                              OPTIONAL,
    measResultReportCGI-EUTRA    SEQUENCE {
      eutraFrequency             ARFCN-ValueEUTRA,
      cellForWhichToReportCGI-EUTRA   EUTRA-PhysCellId,
      cgi-InfoEUTRA              CGI-InfoEUTRA
    }                                                   OPTIONAL,
    measResultCellListSFTD-EUTRA    MeasResultCellListSFTD-EUTRA
OPTIONAL,
    fr-InfoListMCG          FR-InfoList                   OPTIONAL,
nonCriticalExtension        SEQUENCE { }                  OPTIONAL
}
ConfigRestrictInfoSCG :=     SEQUENCE {
    allowedBC-ListMRDC          BandCombinationInfoList                 OPTIONAL,
    powerCoordination-FR1           SEQUENCE {
      p-maxNR-FR1           P-Max                         OPTIONAL,
      p-maxEUTRA            P-Max                         OPTIONAL,
      p-maxUE-FR1           P-Max                         OPTIONAL
    }                                         OPTIONAL,
    servCellIndexRangeSCG       SEQUENCE {
      lowBound                  ServCellIndex,
      upBound                   ServCellIndex
    }
                                OPTIONAL, -- Cond SN-AddMod
    maxMeasFreqsSCG         INTEGER(1..maxMeasFreqsMN)              OPTIONAL,
-- TBD Late Drop: If maxMeasIdentitiesSCG is used needs to be decided after RAN4 replies to
the LS on measurement requirements for MR-DC
    maxMeasIdentitiesSCG-NR    INTEGER(1..maxMeasIdentitiesMN)
OPTIONAL,
``` |

| CG-ConfigInfo message |
|---|
| ...,<br>[[<br>selectedBandEntriesMN      SEQUENCE (SIZE (1..maxSimultaneousBands)) OF BandEntryIndex OPTIONAL,<br>  pdcch-BlindDetectionSCG     INTEGER (1..15)                     OPTIONAL,<br>  maxNumberROHC-ContextSessionsSN INTEGER(0.. 16384)            OPTIONAL<br>]]<br>}<br>BandEntryIndex ::=      INTEGER (0.. maxNrofServingCells)<br>PH-TypeListMCG ::=      SEQUENCE (SIZE (1..maxNrofServingCells)) OF PH-InfoMCG<br>PH-InfoMCG ::=      SEQUENCE {<br>  servCellIndex      ServCellIndex,<br>  ph-Uplink      PH-UplinkCarrierMCG,<br>  ph-SupplementaryUplink      PH-UplinkCarrierMCG                OPTIONAL,<br>  ...<br>}<br>PH-UplinkCarrierMCG ::=      SEQUENCE{<br>  ph-Type1or3      ENUMERATED {type1, type3},<br>  ...<br>}<br>BandCombinationInfoList :=      SEQUENCE (SIZE (1..maxBandComb)) OF BandCombinationInfo<br>BandCombinationInfo ::=      SEQUENCE {<br>  bandcombinationIndex      BandCombinationIndex,<br>  allowedFeatureSetsList      SEQUENCE (SIZE (1..maxFeatureSetsPerBand)) OF FeatureSetEntryIndex<br>}<br>FeatureSetEntryIndex ::=      INTEGER (1.. maxFeatureSetsPerBand)<br>DRX-Info ::=      SEQUENCE {<br>  drx-LongCycleStartOffset      CHOICE {<br>    ms10      INTEGER(0..9),<br>    ms20      INTEGER(0..19),<br>    ms32      INTEGER(0..31),<br>    ms40      INTEGER(0..39),<br>    ms60      INTEGER(0..59),<br>    ms64      INTEGER(0..63),<br>    ms70      INTEGER(0..69),<br>    ms80      INTEGER(0..79),<br>    ms128      INTEGER(0..127),<br>    ms160      INTEGER(0..159),<br>    ms256      INTEGER(0..255),<br>    ms320      INTEGER(0..319),<br>    ms512      INTEGER(0..511),<br>    ms640      INTEGER(0..639),<br>    ms1024      INTEGER(0..1023),<br>    ms1280      INTEGER(0..1279),<br>    ms2048      INTEGER(0..2047),<br>    ms2560      INTEGER(0..2559),<br>    ms5120      INTEGER(0..5119),<br>    ms10240      INTEGER(0..10239)<br>  },<br>  shortDRX      SEQUENCE {<br>    drx-ShortCycle      ENUMERATED {<br>      ms2, ms3, ms4, ms5, ms6, ms7, ms8, ms10, ms14. ms16, ms20, ms30, ms32,<br>      ms35, ms40, ms64, ms80, ms128, ms160, ms256, ms320, ms512, ms640, spare9,<br>      spare8, spare7, spare6, spare5, spare4, spare3, spare2, spare1 },<br>    drx-ShortCycleTimer      INTEGER (1..16)<br>  }                                                                            OPTIONAL<br>}<br>MeasConfigMN := SEQUENCE {<br>  measuredFrequenciesMN      SEQUENCE (SIZE (1..maxMeasFreqsMN)) OF NR-FreqInfo OPTIONAL,<br>  measGapConfig      SetupRelease { GapConfig }      OPTIONAL,<br>  gapPurpose      ENUMERATED {perUE, perFR1}      OPTIONAL,<br>  ...,<br>  [[ measGapConfigFR2      SetupRelease { GapConfig }      OPTIONAL<br>  ]]<br>}<br>MRDC-AssistanceInfo := SEQUENCE {<br>  affectedCarrierFreqCombInfoListMRDC   SEQUENCE (SIZE (1..maxNrofCombIDC)) OF AffectedCarrierFreqCombInfoMRDC,<br>  ...<br>}<br>AffectedCarrierFreqCombInfoMRDC ::= SEQUENCE {<br>  victimSystemType      VictimSystemType,<br>  interferenceDirectionMRDC      ENUMERATED {eutra-nr, nr, other, utra-nr-other, nr-other, |

| CG-ConfigInfo message |
|---|
| ```
spare3, spare2, spare1},
    affectedCarrierFreqCombMRDC    SEQUENCE {
        affectedCarrierFreqCombEUTRA    AffectedCarrierFreqCombEUTRA
OPTIONAL,
        affectedCarrierFreqCombNR       AffectedCarrierFreqCombNR
    } OPTIONAL
}
VictimSystemType ::= SEQUENCE {
    gps         ENUMERATED {true}   OPTIONAL
    glonass     ENUMERATED {true}   OPTIONAL,
    bds         ENUMERATED {true}   OPTIONAL,
    galileo     ENUMERATED {true}   OPTIONAL,
    wlan        ENUMERATED {true}   OPTIONAL,
    bluetooth   ENUMERATED {true}   OPTIONAL
}
AffectedCarrierFreqCombEUTRA ::= SEQUENCE (SIZE (1..maxNrofServingCellsEUTRA)) OF
ARFCN-ValueEUTRA
AffectedCarrierFreqCombNR ::= SEQUENCE (SIZE (1..maxNrofServingCells)) OF ARFCN-ValueNR
-- TAG-CG-CONFIG-INFO-STOP
-- ASN1STOP
``` |

A fourth exemplary IE is a MeasGapConfig IE. A MeasGapConfig IE specifies the measurement gap configuration and controls setup/release of measurement gaps.

| MeasGapConfig information element |
|---|
| ```
-- ASN1START
-- TAG-MEASGAPCONFIG-START
MeasGapConfig ::=      SEQUENCE {
    gapFR2         SetupRelease { GapConfig }       OPTIONAL, --
Need M
    ...,
    [[
    gapFR1         SetupRelease { GapConfig }       OPTIONAL, --
Need M
    gapUE          SetupRelease { GapConfig }       OPTIONAL --
Need M
    ]]
}
GapConfig ::=          SEQUENCE {
    gapOffset          INTEGER (0..159),
    mgl                ENUMERATED {ms1dot5, ms3, ms3dot5, ms4, ms5dot5, ms6},
    mgrp               ENUMERATED {ms20, ms40, ms80, ms160},
    mgta               ENUMERATED {ms0, ms0dot25, ms0dot5},
    ...,
    [[
    refServCellIndicator   ENUMERATED {pCell, pSCell, mcg-FR2}
OPTIONAL -- Cond NEDCorNRDC
    ]]
}
-- TAG-MEASGAPCONFIG-STOP
-- ASN1STOP
``` |

An eNodeB (eNB) or a gNB that may order a UE to make a measurement on a NR cell may need to decide which length SMTC window will be used, and if the ssb-ToMeasure parameter and/or deriveSSB-IndexFromCell will be used. An input to this decision includes knowledge about a time synchronization error. If a cell to be measured is TDD, the time synchronization requirement is known, but if it is FDD it is not known. If the time synchronization error is not signalled in the interfaces between nodes (e.g., because SFTD measurements are not supported by UEs), it has to be configured which is time consuming and can cause mistakes.

Various embodiments of the present disclosure may provide solutions to these and other potential problems. In various embodiments of the present disclosure, information about synchronization sources (e.g. time source, time scale) and clock qualities (e.g. accuracy, offset, variance, etc.) may be added per node or cell over at least one of the F1AP, XnAP and X2AP interfaces. The information about synchronization sources is referred to herein as timing accuracy information or synchronization information.

Potential advantages provided by various embodiments of the present disclosure may include that, by including time accuracy information, it may be possible to optimize the logic of what connectivity scenarios are supported between cells in different nodes.

As an example, in the case of NR FDD and LTE FDD, it may be possible that precision time protocol (PTP) is being used as synchronization for one of the nodes. In case PTP degrades to 300 us accuracy, dual connectivity might be possible or not depending on the accuracy of the clock in the neighboring node.

If the neighboring node is also using a degraded PTP (resulting in a possible 0.6 ms error between nodes), dual connectivity may be problematic or not possible, but if the neighboring node is using global positioning system (GPS), dual connectivity may work fine.

An additional potential benefit of various embodiments of the present disclosure is in the case of NR FDD (where the synchronization requirements may be more lenient), or inter-radio access technology (IRAT) measurements between LTE and NR, may be that depending on the uncertainty, the node can decide whether the use of short gaps is appropriate or not. Alternatively, the node can indicate to the UE to measure on the target cell by using the source cell timing (which may only be possible when there is tight synchronization).

An additional potential benefit of various embodiments of the present disclosure may be as input to the decision of which SMTC window length to use and whether the ssb-ToMeasure parameter and/or deriveSSB-IndexFromCell can be used.

In various embodiments of the present disclosure, information regarding a synchronization source may be provided in a new IE to neighboring nodes in at least one of the interfaces F1AP, X2AP, and XnAP, and also in an eventual interface between two gNB-DUs.

In some embodiments, a node (e.g., a gNB) uses timing accuracy and synchronization state information from a neighbor node (e.g., another gNB) to maintain timing synchronization in the scenario that the node's local GPS or PTP sync source input is lost. As an example, a node that has lost its local GPS or PTP sync source input uses measured offsets determined based on a neighbor nodes timing information in order to maintain synchronization. However, in order to maintain synchronization using a neighbor nodes timing information, the timing accuracy of the neighbor should have a high accuracy. Thus, the node needs to know the accuracy of the sync source of the neighbor node.

In some embodiments, the timing accuracy information includes, but is not limited to:
- Information regarding which sync source(s) is used (GPS/global navigation satellite system (GNSS), PTP, manually configured, internal oscillator, radio interface based synchronization (RIBS), etc.). The information might contain information about the priority.
- Information about the status of the synchronization, e.g. if we are time synchronized to the network source, if the clock is in holdover mode or if it is not time synchronized.
- Information about the sync source accuracy, indicating the precision of the clock.
- Information about the stability of the sync source, providing for example its variance.
- Information about the timescale used (e.g. coordinated universal time (UTC), GPS, international atomic time (TAI), etc.) and the origin of time or epoch of the given timescale.
- Information about whether the node or function is synchronized directly to an absolute time reference source (e.g. a GPS source) or if it is synchronized to another node or function which in turns is synchronized to an absolute time reference source. The indication can consist of the number of "hops" (e.g., the number of intermediate synchronization nodes/functions) between the node or function signaling the information and the node/function providing an absolute time synchronization source FIG. 5 is a block diagram of components of a radio access network in accordance with various embodiments of the present disclosure.

Figure 5:
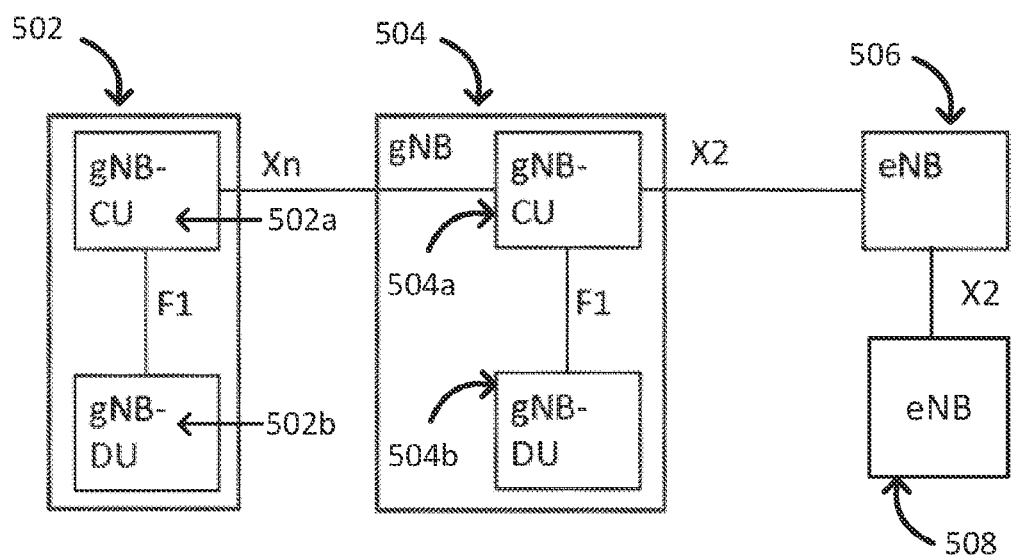
FIG. 5 is a block diagram of components of a radio access network in accordance with various embodiments of the present disclosure.

Although the subject matter described herein may be implemented in any appropriate type of system using any suitable components, the embodiments disclosed herein are described in relation to a radio access network, such as the example radio access network illustrated in FIG. 5. For simplicity, the radio access network of FIG. 5 only depicts gNB 502 having a gNB-central unit (gNB-CU) 502a and a gNB-distributed unit (gNB-DU) 502b, gNB 504 having a gNB-CU 504a and a gNB-DU 504b, eNB 506 and eNB 508. Interface F1 is shown between gNB-CU 502a and gNB-DU 502b and between gNB-CU 504a and gNB-DU 504b, respectively. Interface X2 is shown between gNB-CU 504a and eNB 506 and between eNB 506 and 3NB 508, respectively. Interface Xn is shown between gNB-CU 502a and gNB-CU 504a. In practice, a radio access network may further include any additional elements suitable to support communication between wireless devices or between a wireless device and another communication device, such as any other network node or end device. gNB 502, gNB 504 eNB 506, and eNB 508 each are sometimes referred to herein as a network node or node.

Figure 6:
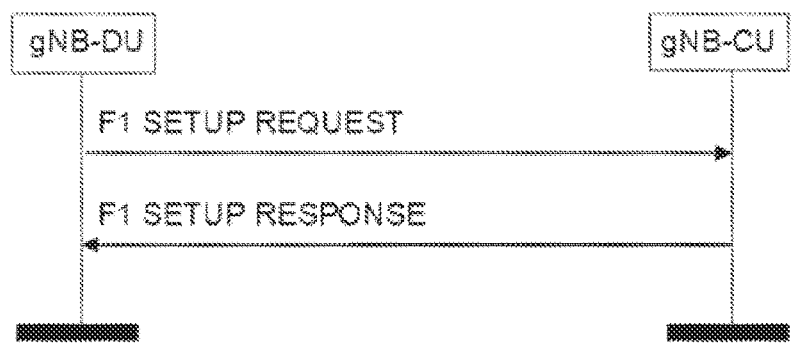
FIG. 6 illustrates a F1 setup procedure, successful operation as shown in FIG. 8.2.3.2-1 from 3GPP TS 38.473 v15.3.0.
Figure 8:
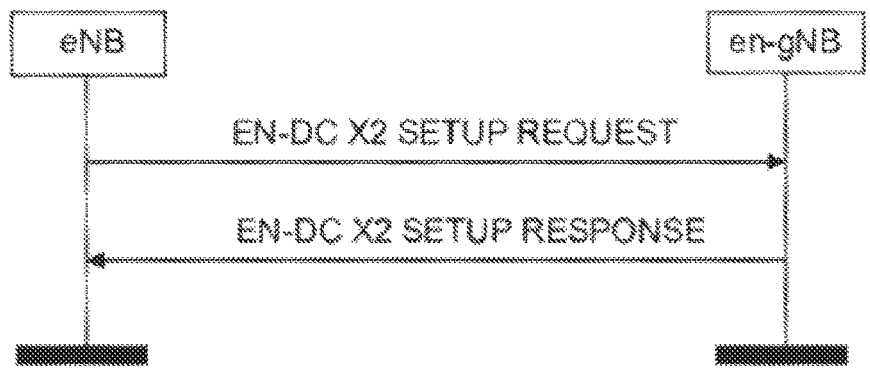
FIGS. 8 and 9 illustrate EN-DC X2 setup procedures, successful operation as shown in FIG. 8.7.1.2-1 and 8.7.1.2-2 from 3GPP TS 36.423 v15.7.0, respectively.

FIG. 6 illustrates a F1 setup procedure, successful operation as shown in FIG. 8.2.3.2-1 from 3GPP TS 38.473 v15.3.0. An exemplary embodiment in accordance with inventive concepts of the present disclosure for an F1AP interface, where timing accuracy information can be sent per gNB-DU (shown with underlining below) is as follows:

F1 Setup Request

This message is sent by the gNB-DU to transfer information associated to an F1-C interface instance.

NOTE: If a transport network layer (TNL) association is shared among several F1-C interface instances, several F1 Setup procedures are issued via the same TNL association after that TNL association has become operational.

Direction: gNB-DU→gNB-CU

| IE/Group Name | Presence | Range | IE type and reference | Semantics description | Criticality | Assigned Criticality |
|---|---|---|---|---|---|---|
| Message Type | M | | 9.3.1.1 | | YES | reject |
| Transaction ID | M | | 9.3.1.23 | | YES | reject |
| gNB-DU ID | M | | 9.3.1.9 | | YES | reject |
| gNB-DU Name | O | | PrintableString (SIZE(1 . . . 150, . . .)) | | YES | ignore |
| gNB-DU Served Cells List | | 0 . . . 1 | | List of cells configured | YES | reject |

| IE/Group Name | Presence | Range | IE type and reference | Semantics description | Criticality | Assigned Criticality |
|---|---|---|---|---|---|---|
| | | | | in the gNB-DU | | |
| >gNB-DU Served Cells Item | | 1 ... <maxCellingNBDU> | | | EACH | reject |
| >>Served Cell Information | M | | 9.3.1.10 | Information about the cells configured in the gNB-DU | — | |
| >>gNB-DU System Information | O | | 9.3.1.18 | RRC container with system information owned by gNB-DU | — | |
| gNB-DU RRC version | M | | RRC version 9.3.1.70 | | YES | reject |
| Syncronization Information | O | | | | YES | reject |

| Range bound | Explanation |
|---|---|
| maxCellingNBDU | Maximum no. cells that can be served by a gNB-DU. Value is 512. |

In another embodiment in accordance with inventive concepts of the present disclosure, in the case of X2AP or XnAP, synchronization information can be shared:

Per cell (for example in case of split deployment, where different cells can be deployed in different gNB-DUs or eNB-DU which can have different network synchronization configuration)

Per node if the node is implemented in non-split deployment.

Per neighbor per cell. Each served cell might contain a list of neighbors.

It is also possible to include the IE per each of those neighbors

Figure 7:
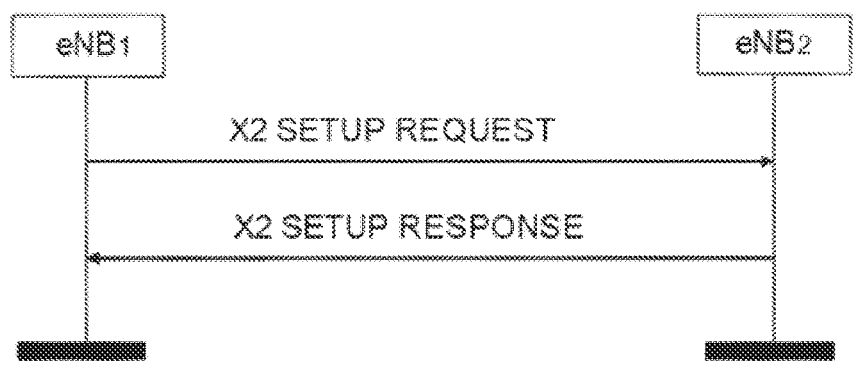
FIG. 7 illustrates an X2 setup procedure, successful operation as shown in FIG. 8.3.3.2-1 from 3GPP TS 36.423 v15.7.0.
Figure 9:
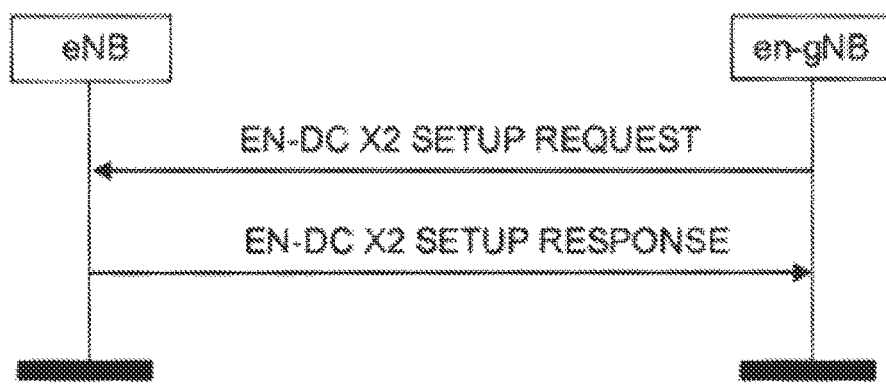

FIG. 7 illustrates an X2 setup procedure, successful operation as shown in FIG. 8.3.3.2-1 from 3GPP TS 36.423 v15.7.0. FIGS. 8 and 9 illustrate EN-DC X2 setup procedures, successful operation as shown in FIGS. 8.7.1.2-1 and 8.7.1.2-2 from 3GPP TS 36.423 v15.7.0, respectively. An exemplary embodiment in accordance with inventive concepts of the present disclosure for an F1AP interface, where timing accuracy information can be sent per gNB-DU (shown with underlining below), is as follows:

X2 Setup Request

This message is sent by an eNB to a neighboring eNB to transfer the initialization information for a TNL association.

| Direction: eNB$_1$ → eNB$_2$. IE/Group Name | Presence | Range | IE type and reference | Semantics description | Criticality | Assigned Criticality |
|---|---|---|---|---|---|---|
| Message Type | M | | 9.2.13 | | YES | reject |
| Global eNB ID | M | | 9.2.22 | | YES | reject |
| Served Cells | | 1 ... <maxCellineNB> | | Complete list of cells served by the eNB | YES | reject |
| >Served Cell Information | M | | 9.2.8 | | — | |
| >Neighbour Information | | 0 ... <max-noofNeighbours> | | | — | |
| >>ECGI | M | | ECGI 9.2.14 | E-UTRAN Cell Global Identifier of the neighbour cell | — | |
| >>PCI | M | | INTEGER (0 ... 503, ...) | Physical Cell Identifier of the neighbour cell | — | |

| Direction: eNB₁ → eNB₂.IE/Group Name | Presence | Range | IE type and reference | Semantics description | Criticality | Assigned Criticality |
|---|---|---|---|---|---|---|
| >>EARFCN | M | | 9.2.26 | DL EARFCN for FDD or EARFCN for TDD | — | |
| >>TAC | O | | OCTET STRING (2) | Tracking Area Code | YES | ignore |
| >>EARFCN Extension | O | | 9.2.65 | DL EARFCN for FDD or EARFCN for TDD. If this IE is present, the value signalled in the EARFCN IE is ignored. | YES | reject |
| >NR Neighbour Information | O | | 9.2.98 | NR neighbour, capable of performing EN-DC with the served E-UTRA cell | YES | ignore |
| GU Group Id List | | 0 . . . \<maxfPools\> | | List of all the pools to which the eNB belongs | GLOBAL | reject |
| >GU Group Id | M | | 9.2.20 | | — | |
| LHN ID | O | | 9.2.83 | | YES | ignore |
| Syncronization Information | O | | | | YES | reject |

| Range bound | Explanation |
|---|---|
| maxCellineNB | Maximum no. cells that can be served by an eNB. Value is 256. |
| maxnoofNeighbours | Maximum no. of neighbour cells associated to a given served cell. Value is 512. |
| maxPools | Maximum no. of pools an eNB can belong to. Value is 16. |

In another embodiment in accordance with inventive concepts of the present disclosure, synchronization information is shared per cell level using the X2AP interface, an X2 Setup procedure and an EN-DC X2 Setup procedure (shown with underlining below), as follows:

For LTE cells:
Served Cell Information
This IE contains cell configuration information of a cell that a neighbor eNB may need for the X2 AP interface.

| IE/Group Name | Presence | Range | IE type and reference | Semantics description | Criticality | Assigned Criticality |
|---|---|---|---|---|---|---|
| PCI | M | | INTEGER (0 . . . 503, . . .) | Physical Cell ID | — | |
| Cell ID | M | | ECGI 9.2.14 | | — | |
| TAC | M | | OCTET STRING(2) | Tracking Area Code | — | |
| Broadcast PLMNs | | 1 . . . \<maxnoofBPLMNs\> | | Broadcast PLMNs | | |
| >PLMN Identity | M | | 9.2.4 | | — | |
| CHOICE EUTRA-Mode-Info | M | | | | — | |
| >FDD | | | | | | |
| >>FDD Info | | 1 | | | | |
| >>>UL EARFCN | M | | EARFCN 9.2.26 | Corresponds to $N_{UL}$ in TS 36.104 [16] for E-UTRA operating bands for which it is | — | |

-continued

| IE/Group Name | Presence | Range | IE type and reference | Semantics description | Criticality | Assigned Criticality |
|---|---|---|---|---|---|---|
| | | | | defined; ignored for E-UTRA operating bands for which $N_{UL}$ is not defined | | |
| >>>DL EARFCN | M | | EARFCN 9.2.26 | Corresponds to $N_{DL}$ in TS 36.104 [16] | — | |
| >>>UL Transmission Bandwidth | M | | Transmission Bandwidth 9.2.27 | Same as DL Transmission Bandwidth in this release; ignored in case UL EARFCN value is ignored | — | |
| >>>DL Transmission Bandwidth | M | | Transmission Bandwidth 9.2.27 | | — | |
| >>>UL EARFCN Extension | O | | EARFCN Extension 9.2.65 | If this IE is present, the value signalled in the UL EARFCN IE is ignored. | YES | reject |
| >>>DL EARFCN Extension | O | | EARFCN Extension 9.2.65 | If this IE is present, the value signalled in the DL EARFCN IE is ignored. | YES | reject |
| >>>Offset of NB-IoT Channel Number to DL EARFCN | O | | Offset of NB-IoT Channel Number to EARFCN 9.2.94 | Corresponds to $M_{DL}$ in TS 36.104 [16] | YES | reject |
| >>>Offset of NB-IoT Channel Number to UL EARFCN | O | | Offset of NB-IoT Channel Number to EARFCN 9.2.94 | Corresponds to $M_{UL}$ in TS 36.104 [16] | YES | reject |
| >>>NRS-NSSS-PowerOffset | O | | ENUMERATED (−3, 0, 3, . . .) | NRS to NSSS power ratio, as defined inTS6.213 [11]. | YES | Ignore |
| >>>NSSS-NumOccasion Different Precoder | O | | ENUMERATED (2, 4, 8, . . .) | The number of consecutive NSSS occasions that use different precoders for NSSS transmission, as defined in TS6.213 [11]. | YES | ignore |
| >TDD | | | | | | |
| >>TDD Info | | 1 | | | — | |
| >>>EARFCN | M | | 9.2.26 | Corresponds to $N_{DL}/N_{UL}$ in TS 36.104 [16] | — | |

-continued

| IE/Group Name | Presence | Range | IE type and reference | Semantics description | Criticality | Assigned Criticality |
|---|---|---|---|---|---|---|
| >>>Transmission Bandwidth | M | | Transmission Bandwidth 9.2.27 | | — | |
| >>>Subframe Assignment | M | | ENUMERATED (sa0, sa1, sa2, sa3, sa4, sa5, sa6, . . .) | Uplink-downlink subframe configuration information defined in TS 36.211 [10]. In NB-IOT, sa0 and sa6 are not applicable. | — | |
| >>>Special Subframe Info | | 1 | | Special subframe configuration information defined in TS 36.211 [10] | — | |
| >>>>Special Subframe Patterns | M | | ENUMERATED (ssp0, ssp1, ssp2, ssp3, ssp4, ssp5, ssp6, ssp7, ssp8, . . .) | | — | |
| >>>>Cyclic Prefix DL | M | | ENUMERATED (Normal, Extended, . . .) | | — | |
| >>>>Cyclic Prefix UL | M | | ENUMERATED (Normal, Extended, . . .) | | — | |
| >>>Additional Special Subframe Info | O | | | Special subframe configuration Information defined in TS 36.211 [10]. Only for newly defined configuration of special subframe from Release 11. | YES | ignore |
| >>>>Additional Special Subframe-Patterns | M | | ENUMERATED (ssp0, ssp1, ssp2, ssp3, ssp4, ssp5, ssp6, ssp7, ssp8, ssp9, . . .) | | — | |
| >>>>Cyclic Prefix DL | M | | ENUMERATED (Normal, Extended, . . .) | | — | |
| >>>>Cyclic Prefix UL | M | | ENUMERATED (Normal, Extended, . . .) | | — | |
| >>>EARFCN Extension | O | | 9.2.65 | If this IE is present, the value signalled in the EARFCN IE is ignored. | YES | reject |
| >>>Additional Special Subframe Extension Info | O | | | Special subframe configuration information defined in TS 36.211 [10]. Only | YES | ignore |

-continued

| IE/Group Name | Presence | Range | IE type and reference | Semantics description | Criticality | Assigned Criticality |
|---|---|---|---|---|---|---|
| | | | | for newly defined configuration of special subframe from Release 14. | | |
| >>>>Additional Special Subframe Patterns Extension | M | | ENUMERATED (ssp10, . . .) | | — | |
| >>>>Cyclic Prefix DL | M | | ENUMERATED (Normal, Extended, . . .) | | — | |
| >>>>Cyclic Prefix UL | M | | ENUMERATED (Normal, Extended, . . .) | | — | |
| Number of Antenna Ports | O | | 9.2.43 | | YES | ignore |
| PRACH Configuration | O | | PRACH Configuration 9.2.50 | | YES | ignore |
| MBSFN Subframe Info | | 0 . . . <maxnoofMBSFN> | | MBSFN subframe defined in TS 36.331 [9] | GLOBAL | ignore |
| >Radioframe Allocation Period | M | | ENUMERATED (n1, n2, n4, n8, n16, n32, . . .) | | — | |
| >Radioframe Allocation Offset | M | | INTEGER (0 . . . 7, . . .) | | — | |
| >Subframe Allocation | M | | 9.2.51 | | — | |
| CSG ID | O | | 9.2.53 | | YES | ignore |
| MBMS Service Area Identity List | | 0 . . . <maxnoofMBMS-ServiceAreaIdentities > | | Supported MBMS Service Area Identities in the cell | GLOBAL | ignore |
| >MBMS Service Area Identity | | | OCTET STRING(2) | MBMS Service Area Identities as defined in TS 23.003 [29] | | |
| MultibandInfoList | O | | 9.2.60 | | YES | ignore |
| FreqBandIndicator-Priority | O | | ENUMERATED (not-broadcasted, broadcasted, . . .) | This IE indicates that the eNodeB supports FreqBand-Indication-Priority, and whether FreqBand-Indicator-Priority is broadcasted in SIB 1 (see TS 36.331 [9]) | YES | ignore |
| Bandwidth-ReducedSI | O | | ENUMERATED (scheduled, . . .) | This IE indicates that the SystemInfor-mationBlock-Type1-BR is scheduled in the cell (see TS | YES | ignore |

| IE/Group Name | Presence | Range | IE type and reference | Semantics description | Criticality | Assigned Criticality |
|---|---|---|---|---|---|---|
| Protected E-UTRA Resource Indication | O | | 9.2.125 | 36.331 [9]) This IE indicates which E-UTRA control/ reference signal resources are protected and are not subject to E-UTRA—NR Cell Resource Coordination. | YES | ignore |
| Broadcast PLMN Identity Info List E-UTRA | | 0 . . . <maxnoofBPLMNs-1> | | This IE corresponds to the cellAccess RelatedInfo IE in SIB1 as specified in TS 36.331 [9]. The PLMN Identities and associated Information contained in this IE shall be provided in the same order as broadcast in SIB1. | YES | ignore |
| >Broadcast PLMNs | | 1 . . . <maxnoofBPLMNs> | | | — | |
| >>PLMN Identity | M | | 9.2.4 | | — | |
| >TAC | M | | OCTET STRING(2) | | — | |
| >E-UTRA Cell Identity | M | | BIT STRING (28) | | — | |
| Syncronization Information | O | | | | YES | reject |

| Range bound | Explanation |
|---|---|
| maxnoofBPLMNs | Maximum no. of Broadcast PLMN Ids. Value is 6. |
| maxnoofMBSFN | Maximum no. of MBSFN frame allocation with different offset. Value is 8. |
| maxnoofMBMSServiceAreaIdentities | Maximum no. of MBMS Service Area Identities. Value is 256. |
| maxnoofBPLMNs-1 | Maximum no. of extended broadcast PLMN Ids minus 1. Value is 5. |

In another embodiment in accordance with inventive concepts of the present disclosure, synchronization information is shared (shown with underlining below) as follows:

For NR cells:

Served NR Cell Information

This IE contains cell configuration information of an NR cell that a neighbor eNB may need for the X2 AP interface.

| IE/Group Name | Presence | Range | IE type and reference | Semantics description | Criticality | Assigned Criticality |
|---|---|---|---|---|---|---|
| NR-PCI | M | | INTEGER (0 . . . 1007) | NR Physical Cell ID | — | |
| Cell ID | M | | NR CGI 9.2.111 | | — | |
| 5GS-TAC | O | | OCTET STRING (3) | Broadcast 5GS Tracking Area Code | — | |
| Configured TAC | O | | OCTET STRING (2) | This is the TAC configured in the en-gNB, different from the 5GS TAC broadcast in the NR cell and enables application of Roaming and Access Restrictions for EN-DC as specified in TS 37.340 [32]. | — | |
| Served PLMNs | | 1 . . . <maxnoofBPLMNs> | | Broadcast PLMNs. If more than maxnoofBPLMNs are needed for NR, they are provided by the Additional PLMNs IE. | — | |
| >PLMN Identity | M | | 9.2.4 | | — | |
| CHOICE NR-Mode-Info | M | | | | — | |
| >FDD | | | | | | |
| >>FDD Info | | 1 | | | — | |
| >>>UL FreqInfo | M | | NR Frequency Info 9.2.106 | | | |
| >>>DL FreqInfo | M | | NR Frequency Info 9.2.106 | | | |
| >>>UL Transmission Bandwidth | M | | NR Transmission Bandwidth 9.2.114 | | — | |
| >>>DL Transmission Bandwidth | M | | NR Transmission Bandwidth 9.2.114 | | — | |
| >TDD | | | | | | |
| >>TDD Info | | 1 | | | — | |
| >>>NRFreqInfo | M | | NR Frequency Info 9.2.106 | | | |
| >>>Transmission Bandwidth | M | | NR Transmission Bandwidth 9.2.114 | | | |
| Measurement Timing Configuration | M | | OCTET STRING | Contains the Measurement-Timing-Configuration | — | |

-continued

| IE/Group Name | Presence | Range | IE type and reference | Semantics description | Criticality | Assigned Criticality |
|---|---|---|---|---|---|---|
| Additional PLMNs | | 0 . . . <maxnoofAdditionalPLMNs> | | inter-node message for the served cell, as defined in TS 38.331 [31]. Additional PLMNs in addition to the Served PLMNs | YES | reject |
| >PLMN Identity | M | | 9.2.4 | | — | |
| Broadcast PLMN Identity Info List NR | | 0 . . . <maxnoofextBPLMNs-1> | | This IE corresponds to the PLMN-IdentityInfo List IE in SIB1 as specified in TS 38.331 [31]. The PLMN Identities and associated information contained in this IE shall be provided in the same order as broadcast in SIB1. | YES | ignore |
| >Broadcast PLMNs | | 1 . . . <maxnoofextBPLMNs> | | | — | |
| >>PLMN Identity | M | | 9.2.4 | | — | |
| >5GS-TAC | O | | OCTET STRING (3) | | — | |
| >NR Cell Identity | M | | BIT STRING (SiZE(36)) | | — | |
| Syncronization Information | O | | | | YES | reject |

| Range bound | Explanation |
|---|---|
| maxnoofBPLMNs | Maximum no. of broadcast PLMN Ids. Value is 6. |
| maxnoofAdditionalPLMNs | Maximum no. additional PLMN Ids. Value is 6. |
| maxnoofextBPLMNs | Maximum no. of extended broadcast PLMN Ids. Value is 12. |
| maxnoofextBPLMNs-1 | Maximum no. of extended broadcast PLMN Ids minus 1. Value is 11. |

In another embodiment in accordance with inventive concepts of the present disclosure, an IE can be added to neighbor information. For example, for NR neighbors, an IE can be added to neighbor information as follows:

Neighbor Information

This IE contains cell configuration information of NR cells that a neighbor node may need for the X2 AP interface.

| IE/Group Name | Presence | Range | IE type and reference | Semantics description | Criticality | Assigned Criticality |
|---|---|---|---|---|---|---|
| NR Neighbour Information | | 1 . . . <maxnoofNRNeighbours> | | | — | |

| IE/Group Name | Presence | Range | IE type and reference | Semantics description | Criticality | Assigned Criticality |
|---|---|---|---|---|---|---|
| >NR Neighbour Information | | | | | | |
| >>NRPCI | M | | INTEGER (0 . . . 1007) | NR Physical Cell ID | — | |
| >>NR CGI | M | | 9.2.111 | | | |
| >>5GS-TAC | O | | OCTET STRING (3) | Broadcast 5GS Tracking Area Code | — | |
| >>Configured TAG | O | | OCTET STRING (2) | This is the TAC configured in the en-gNB, different from the 5GS TAC broadcast in the NR cell and enables application of Roaming and Access Restrictions for EN-DC as specified in TS 37.340 [32]. | — | |
| >>Measurement Timing Configuration | M | | OCTET STRING | Contains the MeasurementTiming-Configuration inter-node message for the neighbour cell, as defined in TS 38.331 [31]. | — | |
| >>CHOICE NR-Neighbour-Mode-Info | M | | | | — | |
| >>>FDD | | | | | | |
| >>>>FDD Info | | 1 | | | — | |
| >>>>>UL ARFCNFreqInfo | M | | NR ARFCN Frequency Info 9.2.106 | | — | |
| >>>>>DL ARFCNFreqInfo | M | | NR ARFCN Frequency Info 9.2.106 | | — | |
| >>>TDD | | | | | | |
| >>>>TDD Info | | 1 | | | — | |
| >>>>>ARFCNNRFreqInfo | M | | NR ARFCN Frequency Info 9.2.106 | | — | |
| Syncronization Information | O | | | | YES | reject |

| Range bound | Explanation |
| --- | --- |
| maxnoofNRNeighbours | Maximum no. of neighbour NR cells associated to a given served cell. Value is 1024. |

In another embodiment according to inventive concepts of the present disclosure, negotiating how often to update a neighboring node is configured by a source node (e.g., how often to send periodic updates of the clock status or to report to the neighboring node only when the clock has drifted over a given threshold). The update information is added as an additional procedure or as part of an existing procedure.

In another embodiment according to inventive concepts of the present disclosure, a node receives the synchronization information described above.

For example, a node receiving synchronization information, uses the synchronization information to deduce the accuracy with which the sending node is synchronized and, therefore, the potential error of its SFN start with respect to an absolute time reference. With this information, the node receiving the synchronization information is able to deduce when to schedule a measurement gap for a UE that is meant to measure any of the cells for which the synchronization information has been signaled.

For example, a node receiving synchronization information indicating that the time synchronization accuracy of the node hosting cells that need to be measured is e.g. +/−1 ms may decide to schedule longer measurement gaps to a UE that should detect the reference signal of the target cell in question. Also, measurement gaps repetition periods may be configured with an appropriate period length, depending on the synchronization accuracy of the target cell to measure (e.g., a poor accuracy might need frequent measurement gap repetitions).

In another embodiment according to inventive concepts of the present disclosure, the synchronization information described above is provided by the Operation and Maintenance System (OAM system) (e.g., operations, administration and management node 1400), or any external system that has visibility over neighboring nodes and cells of a given RAN node (e.g., supervisory network node 1500). In this exemplary embodiment, when a RAN node adds a cell, or a group of cells, to its neighbor cell list, the RAN node will report the updated neighbor cell relationship table to the OAM system. In turn, the OAM system may signal to the RAN node the synchronization accuracy of each newly added neighbor cell or group of cells.

In various embodiments of the present disclosure, information about a clock used for synchronization, including for example its accuracy, may be added in the X2AP, XnAP, F1AP interfaces.

These and other related operations will now be described in the context of the operational flowchart of FIGS. 10 and 11 that are performed by a network node. Each of the operations described in FIGS. 10-11 can be combined and/or omitted in any combination with each other, and it is contemplated that all such combinations fall within the spirit and scope of this disclosure. For example, some operations of FIG. 10 may be optional or omitted (e.g., operations 1004-1012 may be omitted).

Figure 10:
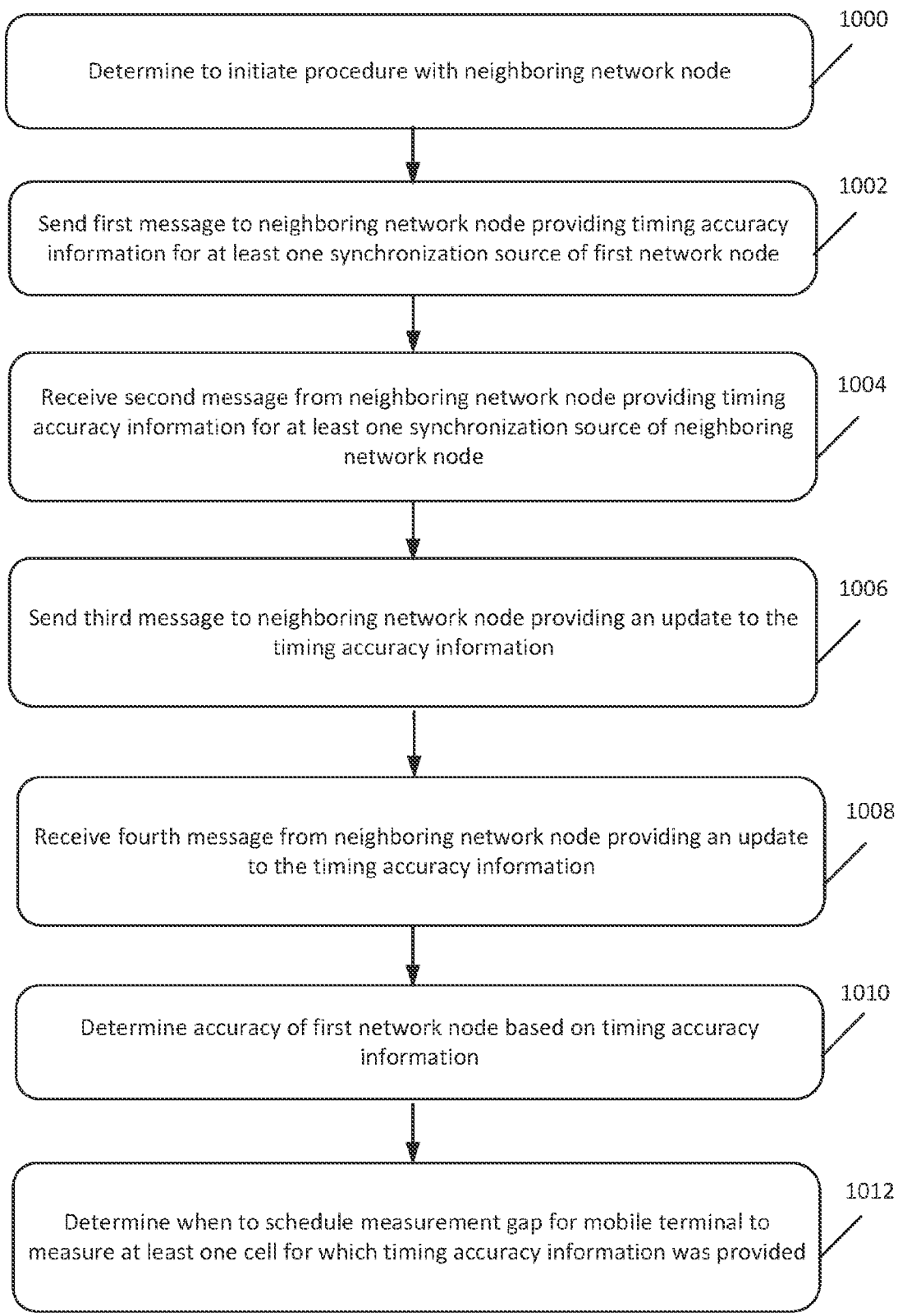
FIGS. 10 and 11 are flowcharts of operations that are performed by a first network node, in accordance with various embodiments of the present disclosure.

Referring initially to FIG. 10, operations are performed by a first network node (e.g., 502a, 502b, 504a, 504b, 502, 504, 506 or 508 in FIG. 5, implemented using the structure of 1200 in FIG. 12) in a radio access network.

Figure 13:
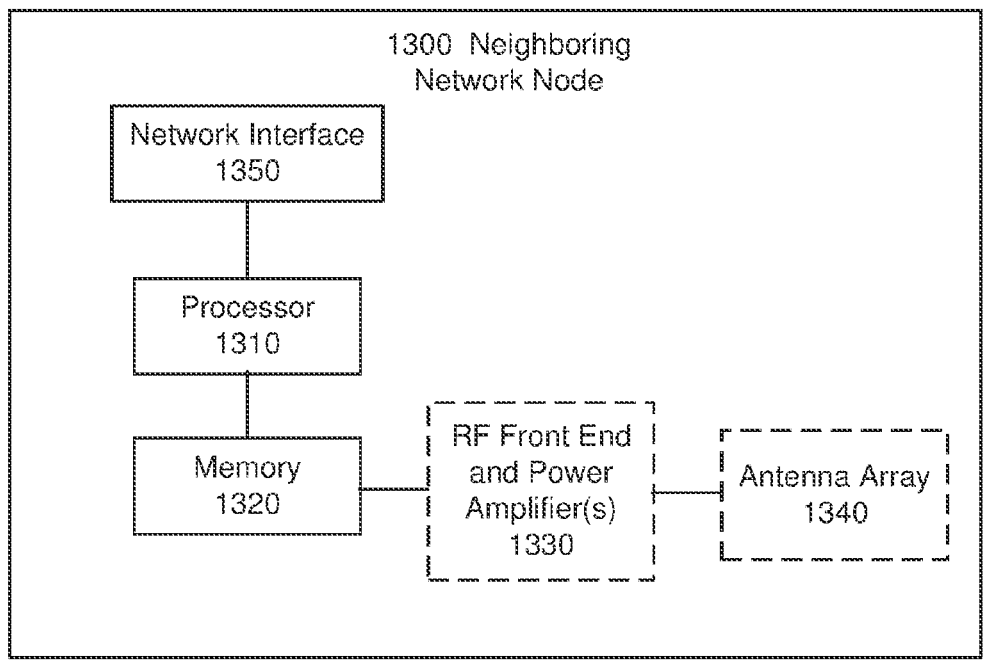
FIG. 13 is a block diagram of elements of a neighbouring network node are configured according to some embodiments of the present disclosure.

In various embodiments, operations that are performed by the first network node can include determining 1000 to initiate a procedure with a first set (e.g., one or more) of at least one neighboring network node (e.g., one or more of 502a, 502b, 504a, 504b, 504, 506, 508 in FIG. 5 having the structure of 1300 in FIG. 13). The operations further include, responsive to the determining, sending 1002 to the first set of at least one neighboring network node a first message comprising timing accuracy information for at least one synchronization source of a first network node on at least one of a per cell basis, a per network node basis, or a per neighboring network node for a cell served by the first network node.

In some embodiments, responsive to the determining, the network node receives a message (e.g., the first message, a second message) comprising timing accuracy information from the first set of at least one neighboring network node (e.g., instead of, or in addition to, sending timing accuracy information responsive to determining to initiate the procedure, the network node requests and receives the timing accuracy information from one or more other network node). In some embodiments, the message includes timing synchronization state information for the first set of at least one neighboring network node. In some embodiments, the network node receives timing accuracy information from one or more other network nodes without determining to initiate the procedure (e.g., routinely receives).

In some embodiments, further operations that are performed by the first network node (e.g., 502, 502a, 502b, 504, 504a, 504b, 506, 508) include receiving 1004 a second message from a second set (e.g., one or more) of at least one neighboring network node (e.g., one or more of 502, 502a, 502b, 504a, 504b, 504, 506, 508 in FIG. 5 having the structure of 1300 in FIG. 13) providing timing accuracy information for at least one synchronization source of the second set of at least one neighboring network node. The providing includes providing the timing accuracy information for the at least one synchronization source of the second set of at least one neighboring network node on at least one of a per cell basis, a per network node basis, or a per neighboring network node for the cell served by the second set of at least one neighboring network node.

In some embodiments, the timing accuracy information includes at least one of: an identity of the at least one synchronization source (e.g., one or more of 502, 502a, 502b, 504a, 504b, 504, 506, 508); a priority level of the at least one synchronization source relative to other synchronization sources; a status of synchronization of the at least one synchronization source; an accuracy of the at least one synchronization source; a stability of the at least one synchronization source; a timescale of the at least one synchronization source; an origin or an epoch of the timescale of the at least one synchronization source; and an indication of whether synchronization is direct or indirect to an absolute time reference source.

In some embodiments, the sending 1002 and the receiving 1004 are each communicated over an F1 application protocol interface.

In some embodiments, the first network node is a distributed unit (e.g., 502b, 504b in FIG. 5 having the structure of 1200 in FIG. 12) of the first network node; and wherein at least one of the first set of at least one neighboring network node and the second set of at least one neighboring network node is a central unit (e.g., 502a, 504a in FIG. 5 having the structure of 1200 in FIG. 12) of the first network node.

In some embodiments, the first message or the second message includes an F1 setup request.

In other embodiments, sending 1002 and the receiving 1004 the first message are each communicated over an X2 application protocol interface or an Xn application protocol interface.

In some embodiments, the first network node is a central unit (e.g., 502a, 504a, 1200) of the first network node; and wherein at least one of the first set of at least one neighboring network node and the second set of at least one neighboring network node is a central unit (e.g., 504a, 1300) of the neighboring network node or a second network node (e.g., 506, 1300).

In some embodiments, the first message or the second message includes an X2 setup request or response or an EN-DC X2 setup request or response.

In some embodiments, the timing accuracy information is provided on the per cell basis for Long Term Evolution cells; and wherein the first message or the second message comprises cell configuration information of a Long Term Evolution cell for the first set of at least one neighboring network node for setting up the X2 application protocol interface.

In other embodiments, the timing accuracy information is provided on the per cell basis for New Radio cells; and wherein the first message or the third message comprises cell configuration information of a New Radio cell for the first set of at least one neighboring network node for setting up the X2 application protocol interface.

In some embodiments, the first network node is a distributed unit (e.g., 502b, 1200) of the first network node. At least one of the first set of at least one neighboring network node and the second set of at least one neighboring network node is a distributed unit (e.g., 504b, 1300) of at least one of the first set of at least one neighboring network node and the second set of at least one neighboring network node, respectively. The sending the first message is communicated over an interface between the distributed unit of the first network node and the distributed unit of the first set of at least one neighboring network node. For example, the interface is direct between distributed units 502b and 504b (e.g., not passing through a CU (e.g., CU 502a and CU504a)).

Still referring to FIG. 10, in some embodiments, further operations that are performed by the first network node include sending 1006 a third message to the first set of at least one neighboring network node (e.g., 502a, 502b, 504a, 504b, 504, 506, 508 in FIG. 5 having the structure of 1300 in FIG. 13) providing an update to the timing accuracy information. The update to the timing accuracy information includes at least one of the following for a time subsequent to when the first message was sent: an identity of the at least one synchronization source; a priority level of the at least one synchronization source relative to other synchronization sources; a status of synchronization of the at least one synchronization source; an accuracy of the at least one synchronization source; a stability of the at least one synchronization source; a timescale of the at least one synchronization source; an origin or an epoch of the timescale of the at least one synchronization source; and an indication of whether the first network node is synchronized directly or indirectly to an absolute time reference source.

In some embodiments, further operations that are performed by the first network node include receiving a fourth message 1008 from the second set of at least one neighboring network node (e.g., 502a, 502b, 504a, 504b, 504, 506, 508, 1300) providing an update to the timing accuracy information. The update to the timing accuracy information includes at least one of the following for a time subsequent to when the second message was received: an identity of the at least one synchronization source; a priority level of the at least one synchronization source relative to other synchronization sources; a status of synchronization of the at least one synchronization source; an accuracy of the at least one synchronization source; a stability of the at least one synchronization source; a timescale of the at least one synchronization source; an origin or an epoch of the timescale of the at least one synchronization source; and an indication of whether the first network node is synchronized directly or indirectly to an absolute time reference source.

In some embodiments, further operations that are performed by first the network node include determining 1010 an accuracy of the first network node (e.g., 502a, 502b, 504a, 504b, 502, 504, 506, 508, 1200) based on the timing accuracy information.

Figure 14:
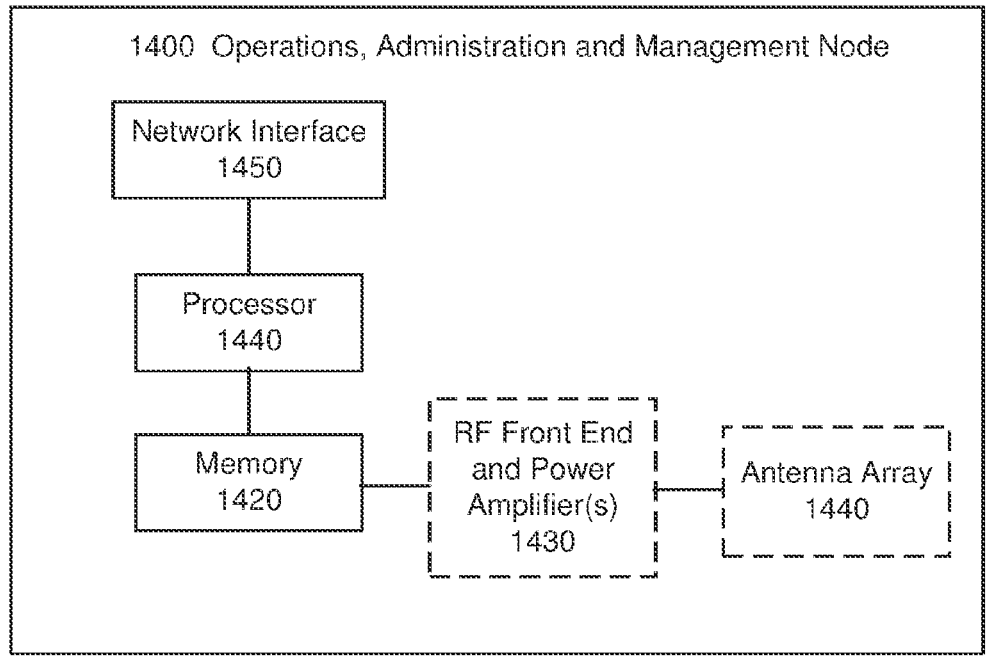
FIG. 14 is a block diagram of elements of an operations, administration and management node that are configured according to some embodiments of the present disclosure.
Figure 15:
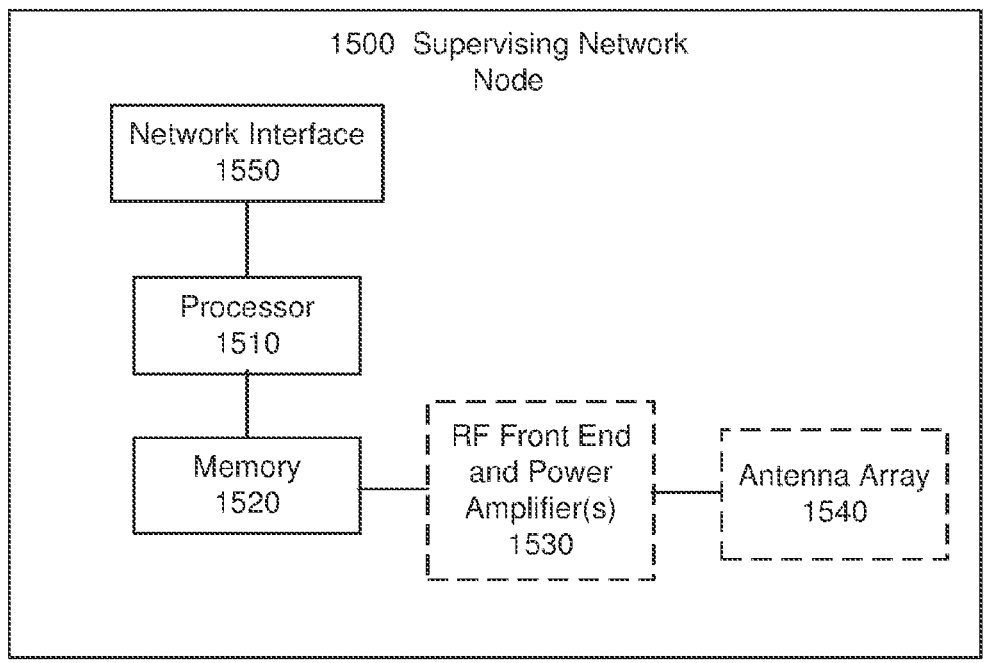
FIG. 15 is a block diagram of a supervising network node that are configured according to some embodiments of the present disclosure.

In some embodiments, the first network node is at least one of an operations, administration and management node (e.g., 1400 in FIG. 14) and a supervising network node (e.g., 1500 in FIG. 15).

In some embodiments, each of the first set of at least one neighboring network node and the second set of at least one neighboring network node is at least one of an operations, administration and management node (e.g., 1400 in FIG. 14) and a supervising network node (e.g., 1500 in FIG. 15).

Figure 11:
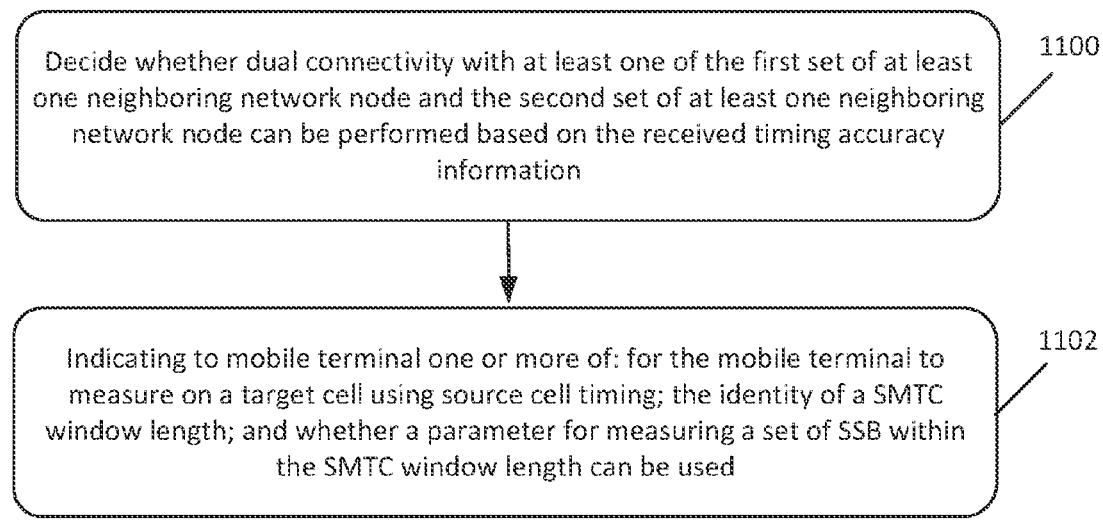

Referring to FIG. 11, in some embodiments, further operations that are performed by the first network node (described with respect to FIG. 10) include deciding (1100) whether dual connectivity with at least one of the first set of at least one neighboring network node and the second set of at least one neighboring network node can be performed based on the received timing accuracy information.

In some embodiments, further operations that are performed by the first network node (described with respect to FIG. 10) include, based on the received timing accuracy information, indicating 1102 to a mobile terminal one or more of: for the mobile terminal to measure on a target cell using source cell timing; the identity of a synchronization signal (SS) physical broadcast channel (PBCH) block measurement time configuration (SMTC) window length; and whether a parameter for measuring a set of synchronization signal blocks (SSB) within the SMTC window length can be used.

Figure 12:
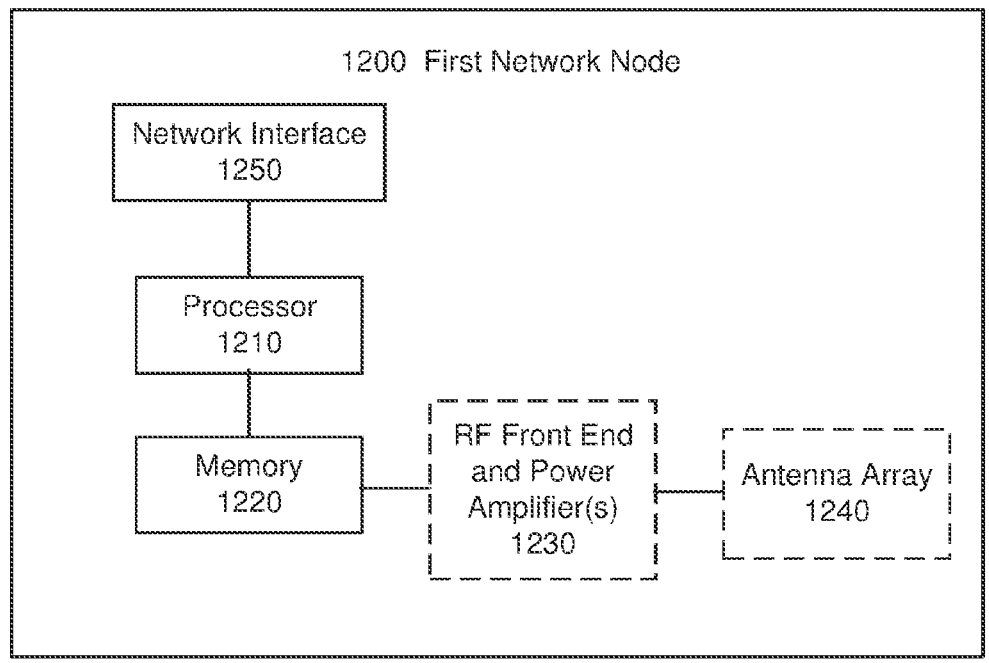
FIG. 12 is a block diagram of elements of a first network node that are configured according to some embodiments of the present disclosure.

FIG. 12 is a block diagram illustrating a first network node 1200 (e.g., a base station, eNB, gNB, etc.) of a radio access network. The first network node 1200 includes a processor circuit 1210 (also referred to as a processor), a memory circuit 1220 (also referred to as memory), and a network interface 1250 (e.g., wired network interface and/or wireless network interface) configured to communicate with other network nodes. The first network node 1200 may be configured as a radio network node containing a RF front-end and/or a light signaling front-end with one or more power amplifiers 1230 that transmit and receive through antennas of an antenna array 1240. The memory 1220 stores computer readable program code that when executed by the processor 1210 causes the processor 1210 to perform operations according to embodiments disclosed herein.

FIG. 13 is a block diagram illustrating a neighboring network node 1300 (e.g., a base station, eNB, gNB, etc.) of a radio access network. The first network node 1300 includes a processor circuit 1310 (also referred to as a processor), a memory circuit 1320 (also referred to as memory), and a network interface 1350 (e.g., wired network interface and/or wireless network interface) configured to communicate with other network nodes. The neighboring network node 1300 may be configured as a radio network node containing a RF front-end and/or a light signaling front-end with one or more power amplifiers 1330 that transmit and receive through antennas of an antenna array 1340. The memory 1320 stores computer readable program code that when executed by the processor 1310 causes the processor 1310 to perform operations according to embodiments disclosed herein.

FIG. 14 is a block diagram illustrating an operations, administration and management node (e.g., an OAM node) for a radio access network. The operations, administration and management node 1400 includes a processor circuit 1410 (also referred to as a processor), a memory circuit 1420 (also referred to as memory), and a network interface 1450 (e.g., wired network interface and/or wireless network interface) configured to communicate with other network nodes. The operations, administration and management node 1400 may be configured as a radio network node containing a RF front-end and/or a light signaling front-end with one or more power amplifiers 1430 that transmit and receive through antennas of an antenna array 1440. The memory 1420 stores computer readable program code that when executed by the processor 1410 causes the processor 1410 to perform operations according to embodiments disclosed herein.

FIG. 15 is a block diagram illustrating a supervising network node for a radio access network. The supervising network node 1500 includes a processor circuit 1510 (also referred to as a processor), a memory circuit 1520 (also referred to as memory), and a network interface 1550 (e.g., wired network interface and/or wireless network interface) configured to communicate with other network nodes. The supervising network node 1500 may be configured as a radio network node containing a RF front-end and/or a light signaling front-end with one or more power amplifiers 1530 that transmit and receive through antennas of an antenna array 1540. The memory 1520 stores computer readable program code that when executed by the processor 1510 causes the processor 1510 to perform operations according to embodiments disclosed herein.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method performed by a first network node in a radio access network, the method comprising:
    determining to initiate a procedure with a first set of at least one neighboring network node;
    responsive to the determining, sending to the first set of at least one neighboring network node a first message comprising timing accuracy information for at least one synchronization source of the first network node on at least one of a per cell basis, a per network node basis, or a per neighboring network node for a cell served by the first network node;
    deciding whether dual connectivity with at least one of the first set of at least one neighboring network node and a second set of at least one neighboring network node can be performed based on the received timing accuracy information; and
    receiving a second message from the second set of at least one neighboring network node providing timing accuracy information for at least one synchronization source of the second set of at least one neighboring network node,
    wherein the providing comprises providing the timing accuracy information for the at least one synchronization source of the second set of at least one neighboring network node on at least one of a per cell basis, a per network node basis, or a per neighboring network node for the cell served by the second set of at least one neighboring network node.

2. The method of claim 1, wherein the timing accuracy information comprises at least one of:
    an identity of the at least one synchronization source;
    a priority level of the at least one synchronization source relative to other synchronization sources;
    a status of synchronization of the at least one synchronization source;
    an accuracy of the at least one synchronization source;
    a stability of the at least one synchronization source;
    a timescale of the at least one synchronization source;
    an origin or an epoch of the timescale of the at least one synchronization source; and
    an indication of whether synchronization is direct or indirect to an absolute time reference source.

3. The method of claim 1, wherein the sending and the receiving are each communicated over an F1 application protocol interface.

4. The method of claim 1, wherein the first network node is a distributed unit of the first network node; and wherein at least one of the first set of at least one neighboring network node and the second set of at least one neighboring network node is a central unit of the first network node.

5. The method of claim 3, wherein the first message or the second message comprises an F1 setup request.

6. The method of claim 1, wherein sending and the receiving the first message are each communicated over an X2 application protocol interface or an Xn application protocol interface.

7. The method of claim 6, wherein the first network node is a central unit of the first network node; and wherein at least one of the first set of at least one neighboring network node and the second set of at least one neighboring network node is a central unit of the neighboring network node or a second network node.

8. The method of claim 6, wherein the first message or the second message comprises at least one of an X2 setup request, an X2 setup response, an EN-DC X2 setup request, and an EN-DC X2 setup response.

9. The method of claim 6, wherein the timing accuracy information is provided on the per cell basis for Long Term Evolution cells; and wherein the first message or the second message comprises cell configuration information of a Long Term Evolution cell for the first set of at least one neighboring network node for setting up the X2 application protocol interface.

10. The method of claim 6, wherein the timing accuracy information is provided on the per cell basis for New Radio cells; and wherein the first message comprises cell configuration information of a New Radio cell for the first set of at least one neighboring network node for setting up the X2 application protocol interface.

11. The method of claim 1, further comprising:
    sending a third message to the first set of at least one neighboring network node providing an update to the timing accuracy information, wherein the update to the timing accuracy information comprises at least one of the following for a time subsequent to when the first message was sent:
    an identity of the at least one synchronization source;
    a priority level of the at least one synchronization source relative to other synchronization sources;
    a status of synchronization of the at least one synchronization source;
    an accuracy of the at least one synchronization source;
    a stability of the at least one synchronization source;
    a timescale of the at least one synchronization source;
    an origin or an epoch of the timescale of the at least one synchronization source; and
    an indication of whether the first network node is synchronized directly or indirectly to an absolute time reference source.

12. The method of claim 1, further comprising:
    determining an accuracy of the first network node based on the timing accuracy information.

13. The method of claim 1, wherein the first network node is at least one of an operations, administration and management node and a supervising network node.

14. The method of claim 1, wherein each of the first set of at least one neighboring network node and the second set of at least one neighboring network node is at least one of an operations, administration and management node and a supervising network node.

15. The method of claim 1, further comprising:
based on the received timing accuracy information, indicating to a mobile terminal one or more of:
for the mobile terminal to measure on a target cell using source cell timing;
the identity of a synchronization signal (SS) physical broadcast channel (PBCH) block measurement time configuration (SMTC) window length; and
whether a parameter for measuring a set of synchronization signal blocks (SSB) within the SMTC window length can be used.

16. A method performed by a first network node in a radio access network, the method comprising:
determining to initiate a procedure with a first set of at least one neighboring network node;
responsive to the determining, sending to the first set of at least one neighboring network node a first message comprising timing accuracy information for at least one synchronization source of the first network node on at least one of a per cell basis, a per network node basis, or a per neighboring network node for a cell served by the first network node; and
deciding whether dual connectivity with at least one of the first set of at least one neighboring network node and a second set of at least one neighboring network node can be performed based on the received timing accuracy information,
wherein the first network node is a distributed unit of the first network node; wherein at least one of the first set of at least one neighboring network node and the second set of at least one neighboring network node is a distributed unit of at least one of the first set of at least one neighboring network node and the second set of at least one neighboring network node, respectively; and
wherein the sending the first message is communicated over an interface between the distributed unit of the first network node and the distributed unit of the first set of at least one neighboring network node.

17. A method performed by a first network node in a radio access network, the method comprising:
determining to initiate a procedure with a first set of at least one neighboring network node;
responsive to the determining, sending to the first set of at least one neighboring network node a first message comprising timing accuracy information for at least one synchronization source of the first network node on at least one of a per cell basis, a per network node basis, or a per neighboring network node for a cell served by the first network node;
deciding whether dual connectivity with at least one of the first set of at least one neighboring network node and a second set of at least one neighboring network node can be performed based on the received timing accuracy information; and
receiving a fourth message from the second set of at least one neighboring network node providing an update to the timing accuracy information, wherein the update to the timing accuracy information comprises at least one of the following for a time subsequent to when the second message was received:
an identity of the at least one synchronization source;
a priority level of the at least one synchronization source relative to other synchronization sources;
a status of synchronization of the at least one synchronization source;
an accuracy of the at least one synchronization source;
a stability of the at least one synchronization source;
a timescale of the at least one synchronization source;
an origin or an epoch of the timescale of the at least one synchronization source; and
an indication of whether the first network node is synchronized directly or indirectly to an absolute time reference source.

18. A method performed by a first network node in a radio access network, the method comprising:
determining to initiate a procedure with a first set of at least one neighboring network node;
responsive to the determining, sending to the first set of at least one neighboring network node a first message comprising timing accuracy information for at least one synchronization source of the first network node on at least one of a per cell basis, a per network node basis, or a per neighboring network node for a cell served by the first network node; and
deciding whether dual connectivity with at least one of the first set of at least one neighboring network node and a second set of at least one neighboring network node can be performed based on the received timing accuracy information;
determining when to schedule a measurement gap for a mobile terminal to measure at least one cell for which the timing accuracy information was provided.

* * * * *